United States Patent
D'Elia et al.

(10) Patent No.: US 10,591,371 B2
(45) Date of Patent: Mar. 17, 2020

(54) SYSTEMS AND METHODS FOR MEASURING DRIVETRAIN POWER TRANSMISSION

(71) Applicant: Level Engineering Inc., San Mateo, CA (US)

(72) Inventors: Christopher R. D'Elia, San Mateo, CA (US); Richard R. D'Elia, San Mateo, CA (US)

(73) Assignee: LEVEL ENGINEERING, INC., San Mateo, CA (US)

( * ) Notice: Subject to any disclaimer, the term of this patent is extended or adjusted under 35 U.S.C. 154(b) by 170 days.

(21) Appl. No.: 15/619,543

(22) Filed: Jun. 12, 2017

(65) Prior Publication Data
US 2017/0356816 A1 Dec. 14, 2017

Related U.S. Application Data

(60) Provisional application No. 62/348,310, filed on Jun. 10, 2016.

(51) Int. Cl.
| | |
|---|---|
| *G01L 3/24* | (2006.01) |
| *G01L 5/00* | (2006.01) |
| *B62M 3/00* | (2006.01) |
| *B62J 99/00* | (2020.01) |

(52) U.S. Cl.
CPC ............ *G01L 3/242* (2013.01); *B62M 3/003* (2013.01); *G01L 5/0019* (2013.01); *B62J 2099/002* (2013.01); *B62J 2099/0013* (2013.01)

(58) Field of Classification Search
CPC ....... G01L 3/2423; G01L 3/242; G01L 3/108; B62M 3/003
See application file for complete search history.

(56) References Cited

U.S. PATENT DOCUMENTS

| | | |
|---|---|---|
| 6,644,135 B1 | 11/2003 | Kishimoto et al. |
| 7,861,599 B2 | 1/2011 | Meggiolan |
| 8,117,923 B2 | 2/2012 | Sasaki |
| 8,170,811 B2 | 5/2012 | Grab et al. |
| 8,316,709 B2 | 11/2012 | Grab |
| 8,453,521 B2 * | 6/2013 | Sasaki .................... B62M 9/131 73/862.045 |
| 8,746,081 B2 | 6/2014 | Sasaki |
| 2006/0245677 A1* | 11/2006 | Kenworthy ........... F16C 19/522 384/448 |
| 2007/0137307 A1* | 6/2007 | Gruben .................... B62M 3/08 73/774 |
| 2013/0024137 A1* | 1/2013 | Grassi ..................... G01L 3/108 702/43 |
| 2014/0165744 A1* | 6/2014 | Lull ................... A63B 24/0087 73/862.338 |

FOREIGN PATENT DOCUMENTS

GB 2456821 A * 7/2009 ............. B62K 19/34

* cited by examiner

*Primary Examiner* — Matthew G Marini
(74) *Attorney, Agent, or Firm* — Gard & Kaslow LLP

(57) ABSTRACT

Power transmitted from a cyclist to a bicycle through crank arms is indirectly measured by performing calculations on direct physical measurements. The direct physical measurements are taken from sensors that can be non-rotationally coupled to the frame of the bicycle. The sensors can be integrated into the frame or installed as a module within a standard, unmodified bicycle bottom bracket. Measured power can be viewed by the cyclist using a wirelessly connected user interface device.

22 Claims, 18 Drawing Sheets

SYSTEMS AND METHODS FOR MEASURING DRIVETRAIN POWER TRANSMISSION

CROSS-REFERENCES TO RELATED APPLICATIONS

The present application claims priority to U.S. Provisional Application No. 62/348,310, entitled "DRIVETRAIN LOAD SENSING APPARATUS", filed Jun. 10, 2016, which is hereby incorporated by reference in its entirety for all purposes.

BACKGROUND

Field

This non-provisional U.S. patent application relates generally to mechanical torque and power measurement and more specifically to a systems and methods for measuring drivetrain power transmission.

Description of Related Art

Bicycles are a popular type of transportation device. A bicycle is generally constructed to include a pair of wheels, a frame, a seat, handlebars, a steering mechanism, and a drivetrain. The drivetrain generally includes a crank assembly, a power transfer element, and a transmission element that allows a cyclist to adjust a drivetrain ratio (gear ratio). The crank assembly typically includes two pedals used by a cyclist to couple rotational power to the drivetrain.

While riding a bicycle, a cyclist typically transmits rotational power to the bicycle through the crank assembly. In certain training scenarios, quantifying the rotational power is useful for tracking and improving cyclist performance. In other scenarios, quantifying rotational power is useful for controlling power output of motorized rider assist systems. For example, a motorized rider assist system can include a battery, an electric motor that is coupled to the drivetrain, and a controller that adjusts power to the electric motor in proportion to rotational power provided by the cyclist.

Certain conventional techniques perform a direct strain or load measurement on drivetrain elements that move relative to the bicycle frame. Such techniques require signal transmission between moving drivetrain elements and the bicycle frame, thereby reducing overall reliability while increasing cost and system complexity. Other conventional techniques fail to accurately measure power transmitted from the cyclist to the drivetrain, limiting usefulness in certain applications. Thus, there is a need for addressing these issues and/or other issues associated with the prior art.

SUMMARY

According to various embodiments, a system, comprising: a measurement side inner bearing cup having an outside diameter, configured to fit within a measurement side outer bearing cup having an inside diameter, wherein an open volume is formed between the outside diameter of the measurement side inner bearing cup and the inside diameter of the measurement side outer bearing cup; a first load sensor, coupled to the measurement side inner bearing cup at a first position along the outside diameter and within the open volume, wherein the first load sensor is configured to provide a first analog electrical signal responsive to a first applied force; a presence sensor configured to generate a detection signal in response to detecting proximity to a detection feature; an analog-to-digital converter configured to sample the first analog electrical signal into corresponding digital values; and a microprocessor coupled to the analog-to-digital converter and the presence sensor, and configured to: generate a force value corresponding to one of the digital values; generate a rotational position value using the detection signal; generate rotational velocity value using the detection signal; calculate a torque value by dividing a first product of multiplying the force value with a length value for a crank arm by a sine function of the rotational position; and calculate a power value by multiplying the torque value with the rotational velocity value.

According to various further embodiments, a method comprising: converting, by a power measurement system, a first analog electrical signal provided by a first load sensor into corresponding digital values, wherein the first analog electrical signal is response to an applied force; generating, by the power measurement system, a force value corresponding to one of the digital values; generating, by the power measurement system, a rotational position value by counting detection signals from a presence sensor, which is configured to detect rotational position changes; generating, by the power measurement system, a rotational velocity value by measuring arrival time intervals for the detection signals; calculating, by the power measurement system, a torque value by dividing a first product of multiplying the force value with a length value for a crank arm by a sine function of the rotational position; and calculating, by the power measurement system, a power value by multiplying the torque value with the rotational velocity value.

According to various still further embodiments, a system comprising: a measurement side inner bearing cup having an outside diameter, configured to fit within a measurement side outer bearing cup having an inside diameter; a first strain block, coupled to the measurement side inner bearing cup at a first position along the outside diameter and the inside diameter of the measurement side outer bearing cup; a first strain gauge, coupled to the first strain block, wherein the first strain gauge is configured to provide a first analog electrical signal responsive to a first applied force; a presence sensor configured to generate a detection signal in response to detecting proximity to a detection feature; an analog-to-digital converter configured to sample the first analog electrical signal into corresponding digital values; and a microprocessor coupled to the analog-to-digital converter and the presence sensor, and configured to: generate a force value corresponding to one of the digital values; generate a rotational position value using the detection signal; generate rotational velocity value using the detection signal; calculate a torque value by dividing a first product of multiplying the force value with a length value for a crank arm by a sine function of the rotational position; and calculate a power value by multiplying the torque value with the rotational velocity value.

DETAILED DESCRIPTION

Systems and methods for measuring drivetrain power transmission are disclosed. The systems and methods can be implemented within the frame of a bicycle to measure power transmission from a cyclist to the bicycle. In one embodiment, a power measurement system is mounted within a bicycle bottom bracket shell of a bicycle frame, with physical sensors advantageously mounted in fixed, non-rotating positions relative to the bicycle frame. The physical sensors include a set of load sensors and a Hall Effect sensor provide physical measurement signals that can be sampled and combined to calculate a real-time measure of power transmission. In one embodiment, the power measurement system is integrated and assembled into a bicycle bottom bracket. In another embodiment, the power measurement system is integrated into a bottom bracket shell, as part of a bicycle frame. In yet another embodiment, the power measurement system is fabricated into a cartridge or module that can be installed into a standard, unmodified bicycle bottom bracket. In certain embodiments, the power measurement system includes circuitry for wirelessly transmitting, without limitation, measured power values to a user interface device for display to the cyclist.

The set of load sensors and the Hall Effect sensor provide requisite physical measurement signals to calculate power transmission. In certain embodiments, measured power transmission is displayed to the cyclist in real-time and/or recorded for later viewing, such as for training purposes. In certain other embodiments, measured power is used to control a motorized assist system coupled to the drivetrain.

In one embodiment, power values are calculated by multiplying a torque value applied to the drivetrain within a time interval by a rotational velocity value of the drivetrain calculated for the time interval.

Figure 1:
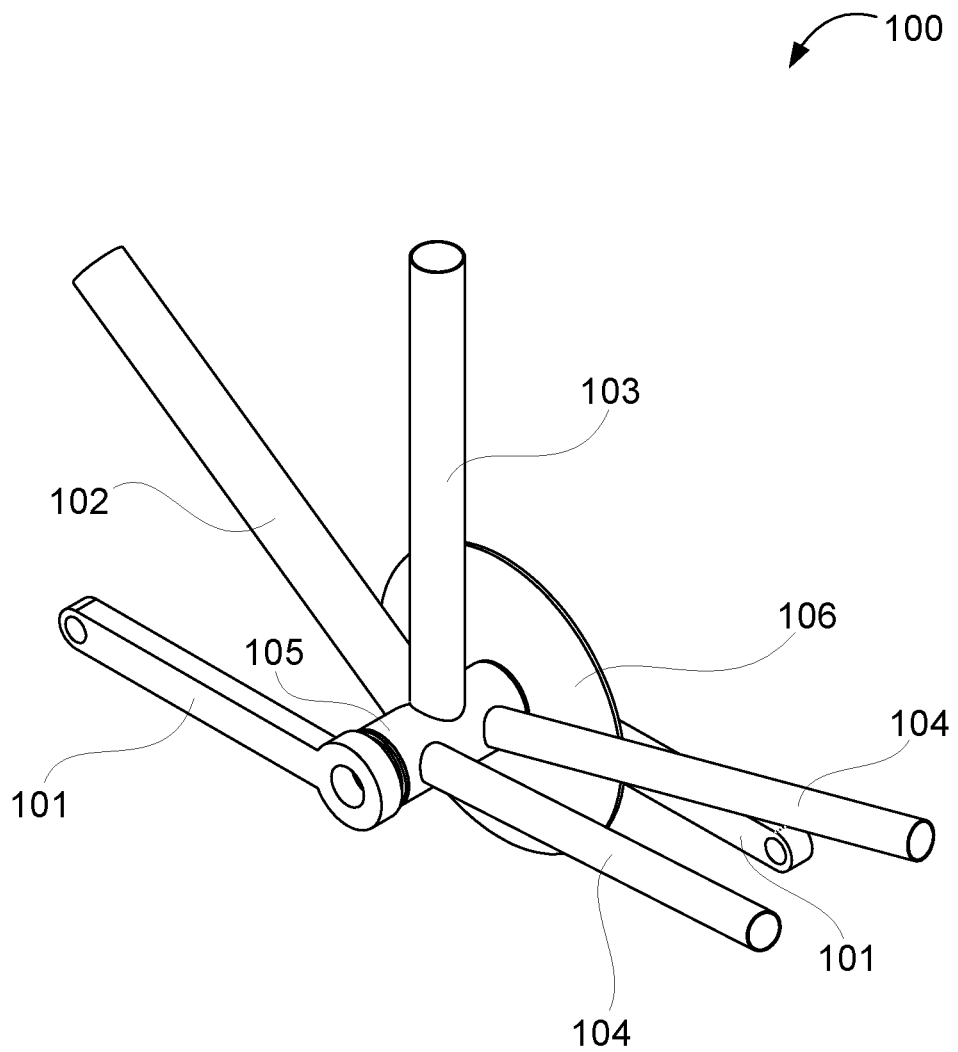
FIG. 1 illustrates a bicycle frame bottom bracket area in which various embodiments can be practiced.

FIG. 1 illustrates a bicycle frame bottom bracket area 100 in which various embodiments can be practiced. As shown, a bottom bracket shell 105 is coupled to a frame down tube 102, a seat post tube 103, chain stay tubes 104, two crank arms 101, and a drive sprocket 106. Other bicycle components used to construct a complete bicycle are not shown herein.

In one embodiment, components comprising a power measurement system disclosed herein are mounted within the bottom bracket shell 105. In certain embodiments, a bearing cup (not shown) is disposed at each of two opposite ends of bottom bracket shell 105, and a bearing (not shown) is inserted into, such as by press fitting, the bearing cups, enclosing the power measurement system within the bottom bracket shell 105.

Figure 2A:
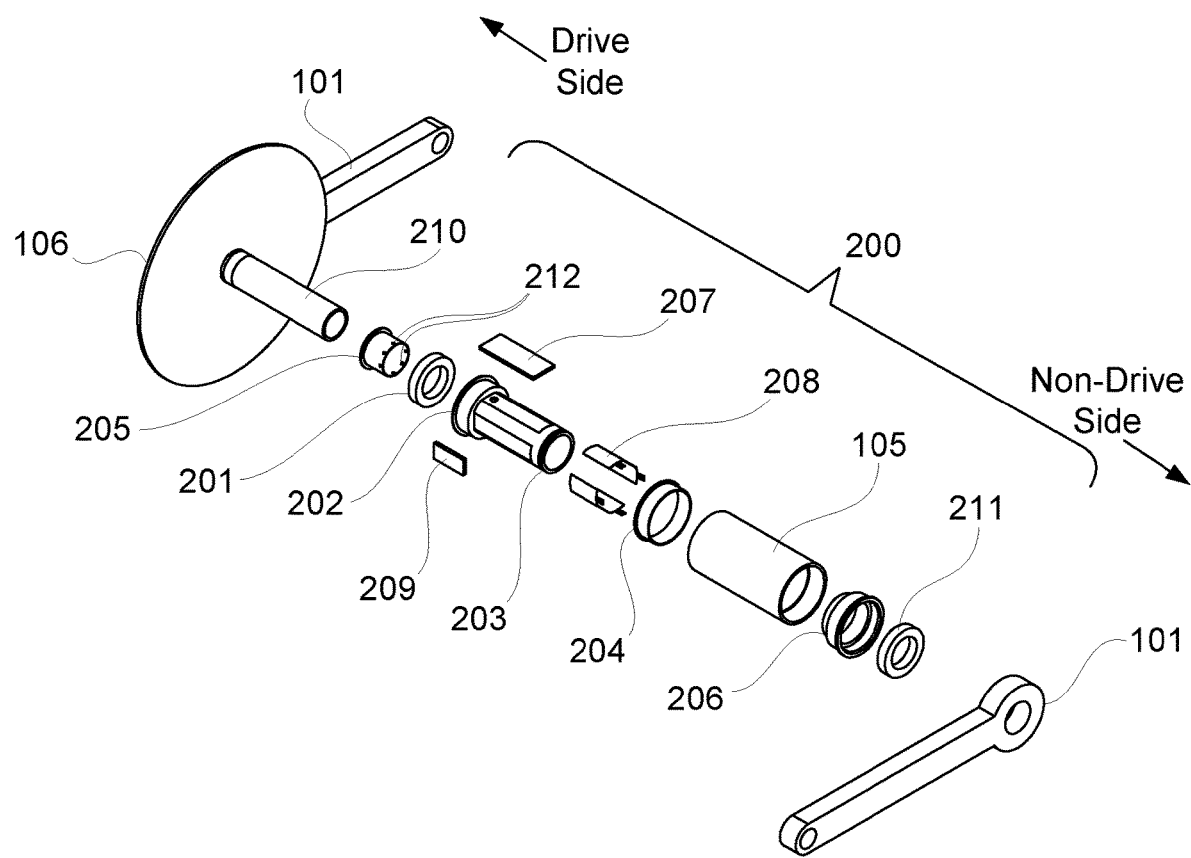
FIG. 2A is an exploded view of a power measurement system, according to some embodiments.

FIG. 2A is an exploded view of a power measurement system 200, according to some embodiments. As shown, power measurement system 200 comprises a drive side bottom bracket bearing 201, a drive side inner bearing cup 202, an inner sleeve 203, a drive side outer bearing cup 204, a crank-position sensor sleeve 205, a non-drive side bearing cup 206, a non-drive side bottom bracket bearing 211, a logic board 207, load sensors 208, a battery 209, and magnets 212. In one embodiment, power measurement system 200 is coupled to a crank spindle 210. In an alternative embodiment, power measurement system 200 includes crank spindle 210. In certain embodiments, power measurement system 200 is disposed within bottom bracket shell 105. In one embodiment, power measurement system 200 further includes a display unit (a user interface device) configured to display measured power.

First crank arm 101 on a drive side and second crank arm 101 at a non-drive side, crank spindle 210, and drive sprocket 106 together comprise a crank assembly. A crank arm 101 is coupled to each opposing end of crank spindle 210. A pedal is rotationally coupled to each crank arm 101. In one embodiment, a cyclist is able to exert a power stroke using their right leg against a pedal coupled to the crank arm 101 on the drive side. Subsequently, the cyclist is able to exert a power stroke using their left leg against a pedal coupled to the crank arm 101 on the non-drive side, and so forth in alternating power strokes. In alternative embodiments, drive sprocket 106 and drive side are disposed at the left side of the cyclist and the non-drive side is disposed at the right side of the cyclist. Each power stroke transmits power from the cyclist to a crank arm 101, and crank spindle 210, which transmits the power to drive sprocket 106. In one embodiment, drive sprocket 106 includes teeth configured to mesh with and transmit power from the power strokes to a chain, which further transmits the power to a rear wheel of a bicycle. In this way, the cyclist is able to provide rotational power at the rear bicycle wheel for propelling the bicycle forward.

In one embodiment, bearing loads are measured nearest the drive side using four load sensors 208. Load sensors 208 are radially mounted in an open volume (e.g., an annulus volume) between drive side outer bearing cup 204 and drive side inner bearing cup 202. In other embodiments, bearing loads are measured using fewer than four or more than four load sensors 208. In an alternative embodiment, bearing loads are measured at the non-drive side. In such an embodiment, the structure of power measurement system 200 can be substantially preserved but with certain drive side and non-drive side components reversed, so that load sensors 208 are configured to measure bearing load at the non-drive side (away from drive sprocket 106).

Drive side inner bearing cup 202 includes a first inside bore configured to accept an outer race of drive side bottom bracket bearing 201. Drive side inner bearing cup 202 also includes an outside diameter to support an inner surface of load sensors 208. A second inside bore of drive side inner bearing cup 202 supports the drive side of inner sleeve 203. In one embodiment, drive side inner bearing cup 202 includes a first flanged lip that registers against drive side outer bearing cup 204 to provide axial positioning.

In one embodiment inner sleeve 203 provides a mounting surface for logic board 207 and battery 209. Inner sleeve 203 is coupled to drive side inner bearing cup 202. Furthermore, inner sleeve 230 is configured to slide inside non-drive side bearing cup 206 and can be sealed with an o-ring (not shown). In alternative embodiments, logic board 207 and/or battery 209 are mounted elsewhere. Battery 209 may be a standard coin cell battery, or rechargeable battery such as a lithium ion battery. Furthermore, battery 209 can be mounted externally for ease of replacement. In one embodiment, battery 209 is mounted within a structural tube (e.g., bicycle frame down tube 102, bicycle frame seat tube 103, bicycle frame chain stay 104) comprising the bicycle frame.

In one embodiment, drive side outer bearing cup 204 accepts an outer surface of load sensors 208, and an outside diameter of drive side outer bearing cup 204 fits inside bottom bracket shell 105. Drive side outer bearing cup 204 includes a second flanged lip that provides axial alignment with a first flanged lip on drive side inner bearing cup 202. A second flanged lip also seats against bottom bracket shell 105.

In one embodiment, crank position sensor sleeve 205 is configured to fit within an inside diameter of an inner race of drive side bottom bracket bearing 201. Crank position sensor sleeve 205 is configured to slide over crank spindle 210. In one embodiment, crank position sensor sleeve 205 has eight evenly spaced radial holes. The radial holes are configured to each hold a magnet 212 radially positioned around crank spindle 210. Magnets 212 can be molded, glued, pressed into, or otherwise coupled to crank position sensor sleeve 205. A hole fabricated in inner sleeve 203 allows a Hall Effect sensor (not shown) to be positioned close to magnets 212. Crank position sensor sleeve 205 includes a third flanged lip, configured to position crank position sensor sleeve 205 against drive side bottom bracket bearing 201.

Non-drive side bearing cup 206 includes an inside bore to accept an outer race of non-drive side bottom bracket bearing 211. Non-drive side bearing cup 206 fits within bottom bracket shell 105. A flange axially positions non-drive side bearing cup 206 with bottom bracket shell 105. Opposite the flange, non-drive side bearing cup 206 accepts inner sleeve 203.

Crank spindle 210 is coupled to the two crank arms 101, which together or separately are coupled to drive sprocket 106. Crank spindle 210 passes through non-drive side bottom bracket bearing 211, drive side bottom bracket bearing 201, and crank position sensor inner sleeve 205. Both drive side bottom bracket bearing 201 and non-drive side bottom bracket bearing 211 support crank spindle 210.

In one embodiment, logic board 207 includes a printed circuit board with surface mounted components and multi-layer interconnection traces. Logic board 207 mounts to inner sleeve 203. Logic board 207 includes a Hall Effect sensor 301 configured to face inner sleeve 203. In certain embodiments, Hall Effect sensor 301 is positioned at least partially within a hole in inner sleeve 203, such that magnets 212 can be readily detected as crank position sensor sleeve 205 rotates. As a magnet 212 approaches, Hall Effect sensor 301 detects a magnetic field from the magnet 212 and generates a detection signal (e.g., a pulse or other form of signal). Interconnecting wires are routed between logic board 207 the load sensors 208. In certain embodiments, the interconnecting wires are fabricated onto a flexible circuit interconnect (e.g., flex cable). Logic board 207 receives and processes cyclist inputs, programming inputs, and electrical signals from load sensors 208, and Hall Effect sensor 301 to calculate power measurement data, such as real-time power generated by a cyclist. In certain embodiments, logic board 207 is configured to transmit data wirelessly to a head unit (user interface device), which displays the data to the cyclist. In one embodiment, battery 209 provides power to the electronics contained in the bicycle bottom bracket assembly (e.g., circuitry on logic board 207), and mounts to inner sleeve 203. While various embodiments described herein refer to magnets 212 and Hall Effect sensor 301, any presence sensor (e.g., Hall Effect sensor, inductive sensor, optical sensor, etc.) can be implemented instead. In general, a presence sensor detects proximity of a physical detection feature. For example, a magnetic presence sensor such as a Hall Effect sensor or inductive sensor (e.g., a coil) detects the proximity of a magnetic field (detection feature) generated by a magnet 212 when the magnet 212 is brought into proximity of the magnetic presence sensor. In another example, an optical sensor detects an optical mark such as a reflective surface (detection feature) brought into proximity of the optical presence sensor.

Figure 2B:
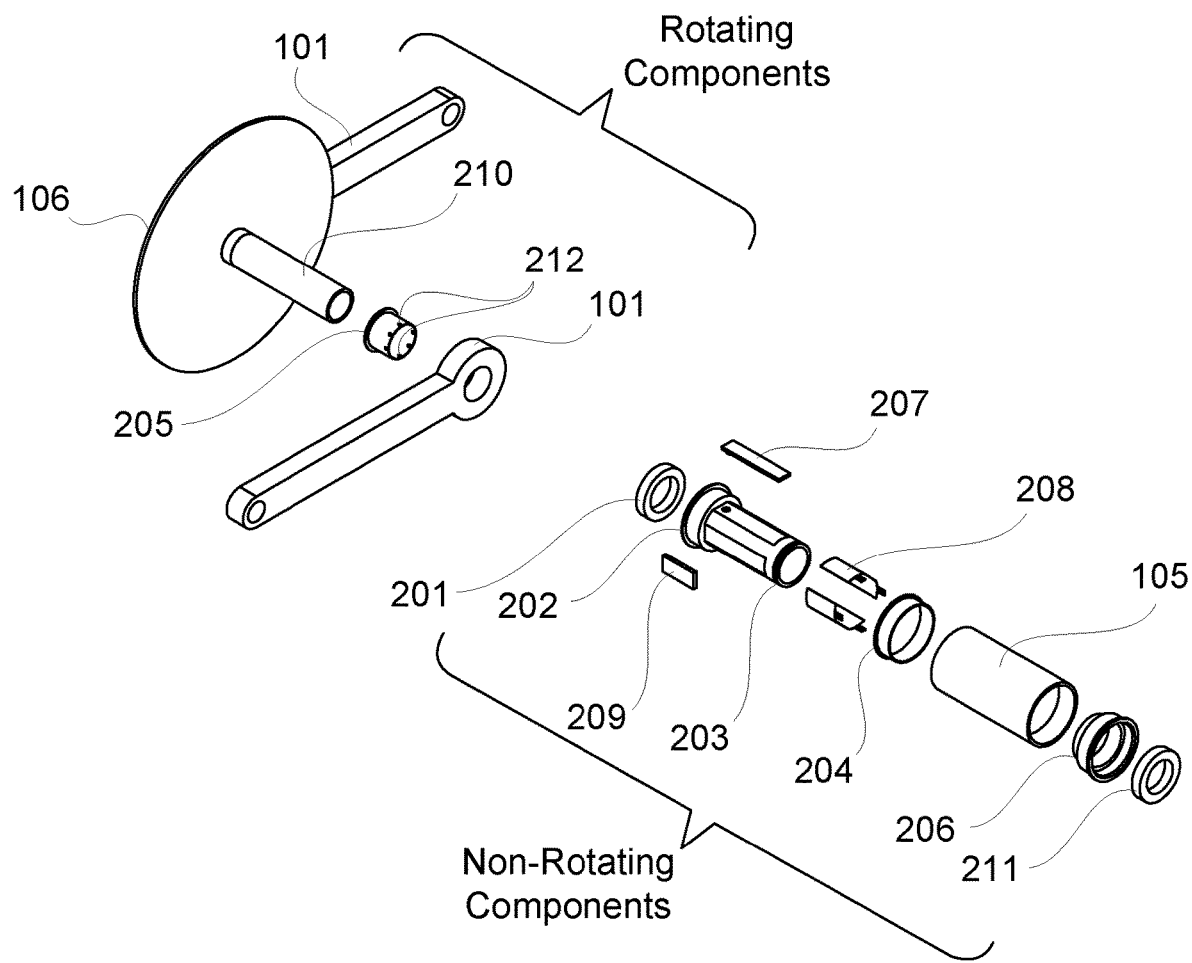
FIG. 2B is an exploded view of a power measurement system with non-rotating components clustered separately from rotating components, according to some embodiments.

FIG. 2B is an exploded view of power measurement system 200 with non-rotating components clustered separately from rotating components, according to some embodiments. In one embodiment, the rotating components include crank spindle 210, crank arms 101, drive sprocket 106, crank position sensor sleeve 205, drive side bottom bracket bearing 201, and magnets 212. Furthermore, the non-rotating components include logic board 207, battery 209, drive side inner bearing cup 202, inner sleeve 203, drive side outer bearing cup 204, non-drive side bearing cup 206, non-drive side bottom bracket bearing 211, and bottom bracket shell 105.

Figure 3A:
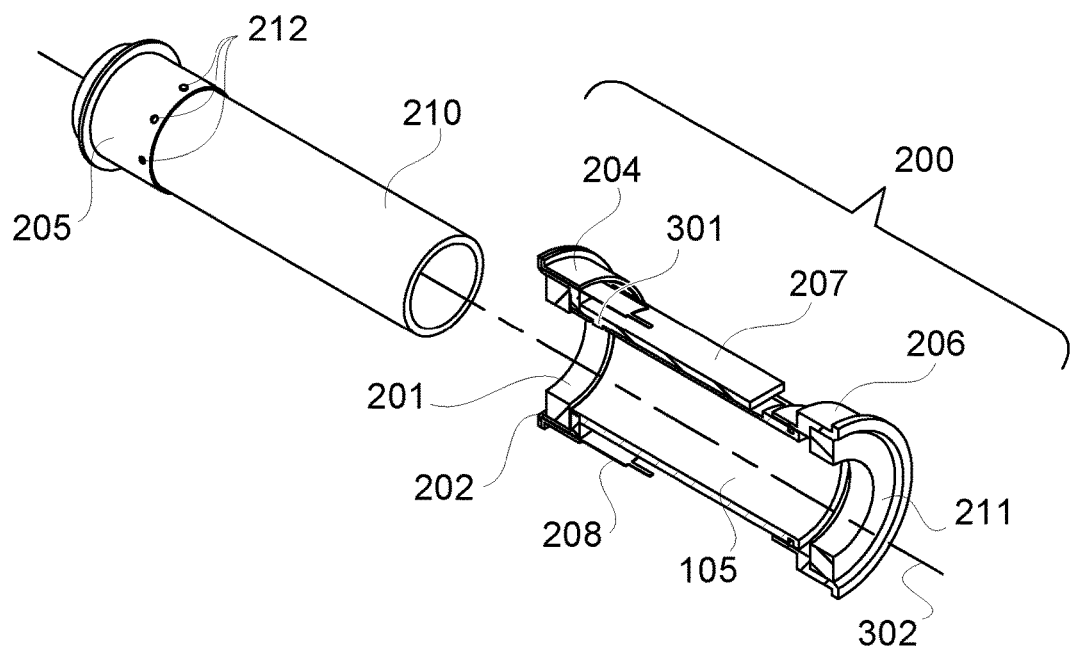
FIG. 3A is a partial section view of a power measurement system, according to some embodiments.

FIG. 3A is a partial section view of power measurement system 200, according to some embodiments. As shown, crank spindle 210 is coupled to crank position sensor sleeve 205. Magnets 212 are coupled to crank position sensor sleeve 205. In one embodiment, eight magnets 212 are coupled to crank position sensor sleeve 205 and evenly positioned at forty-five degree intervals about crank position sensor sleeve 205. During assembly, crank spindle 210 is inserted through two bearings including drive side bottom bracket bearing 201 and non-drive side bottom bracket bearing 211. The two bearings allow crank spindle 210 to rotate freely in place about central axis 302, while drive side bottom bracket bearing 201 is subjected to transient linear forces due to a cyclist power stroke. The transient vertical bearing reaction force values are measured by load sensors 208, while rotational position (angular position) values and rotational velocity (angular velocity) values are calculated from signals generated by Hall Effect sensor 301. Torque is calculated from the vertical bearing reaction force values in combination with rotational position values. Power values are calculated by multiplying calculated torque values with rotational velocity values. For example, in a specific time interval, a vertical bearing reaction force value is measured, a rotational position value measured, and a rotational velocity value is measured. The vertical bearing reaction force is measured by quantizing an electrical load sensor signal using an analog-to-digital converter (ADC). The rotational position value is measured counting a detection signal from Hall Effect sensor 301, and the rotational velocity value is measured as a function of arrival time intervals for the detection signals.

In one embodiment, components of power measurement system 200 are coupled to a bicycle frame and do not rotate or move with respect to the bicycle frame. In certain embodiments, power measurement system 200 is manufactured to be an integral part of the bicycle frame. For example, power measurement system 200 can be integrated into bicycle bottom bracket shell 105. In other embodiments, power measurement system 200 is configured to be a module or cartridge that can be optionally coupled to the bicycle frame, such as by inserting the module or cartridge into bicycle bottom bracket shell 105.

Figure 3B:
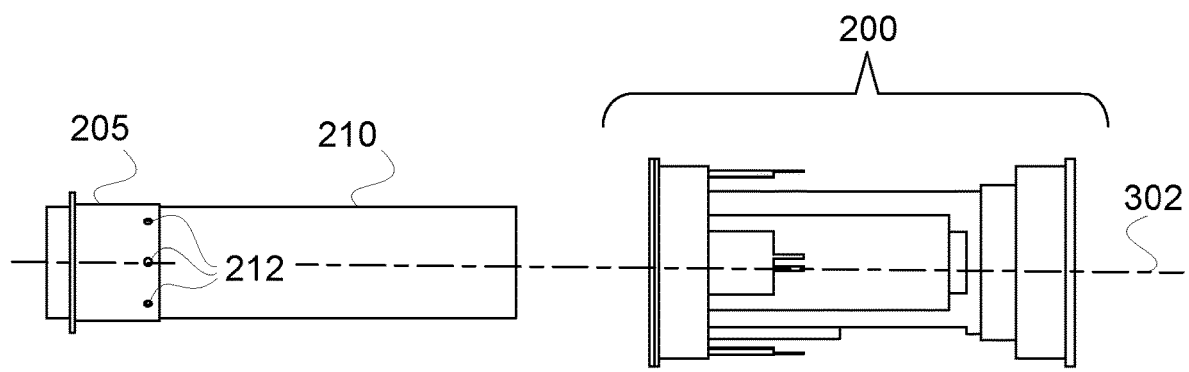
FIG. 3B is a partial side view of a power measurement system, according to some embodiments.

FIG. 3B is a partial side view of power measurement system 200, according to some embodiments. As shown, crank spindle 210 is aligned along central axis 302 when inserted into power measurement system 200. In one embodiment, a crank sensor assembly (e.g., crank sensor assembly 400 of FIG. 4) is configured to measure a rotational position values for crank spindle 210, and a bearing sensor assembly (e.g., bearing sensor assembly 500 of FIG. 5A) is configured to measure vertical force values applied to bearings (vertical bearing reaction) within power measurement system 200.

Figure 4:
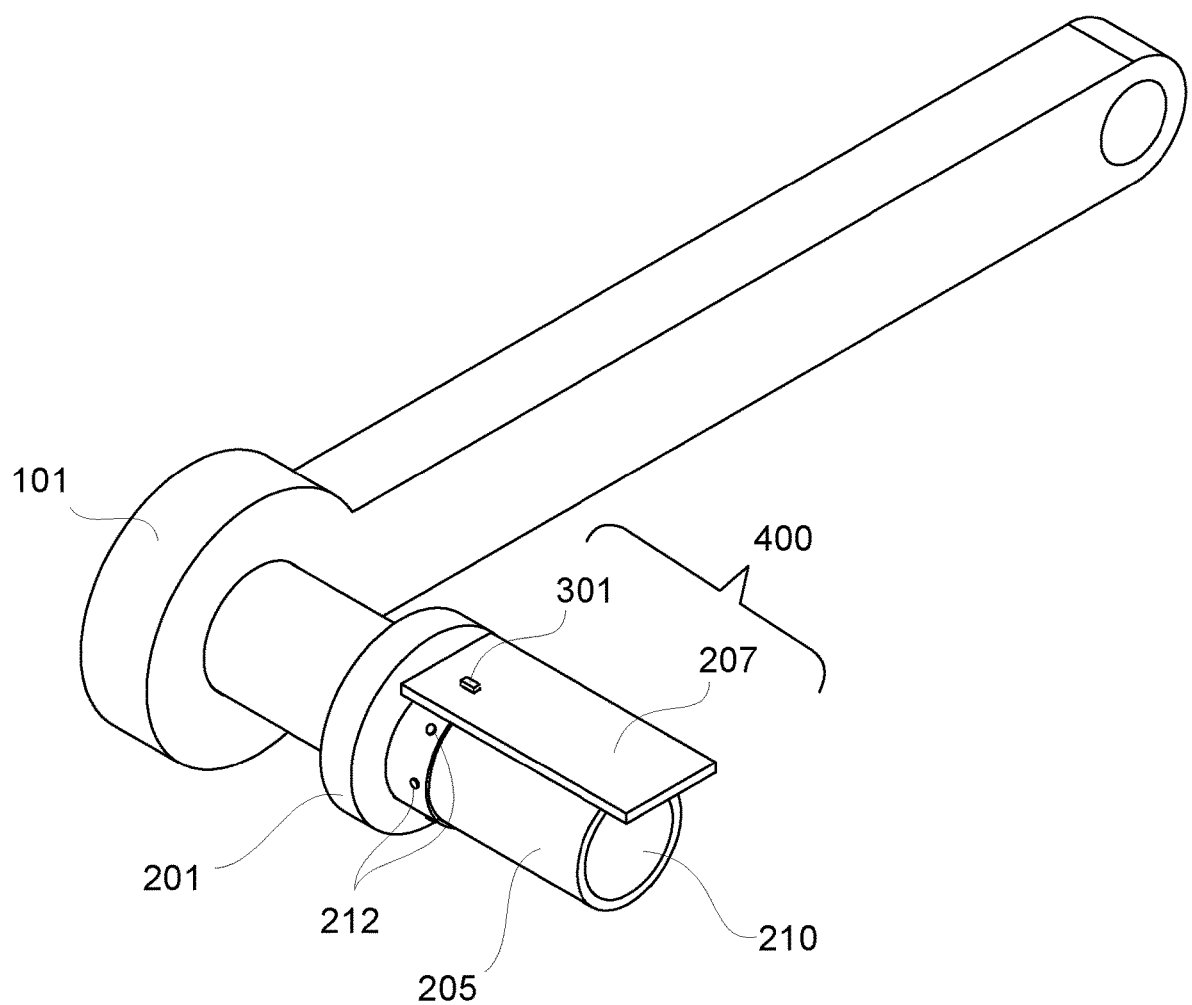
FIG. 4 illustrates a crank sensor assembly, according to some embodiments.

FIG. 4 illustrates a crank sensor assembly 400, according to some embodiments. In one embodiment, crank sensor assembly 400 is configured to measure rotational position of crank spindle 210. Crank sensor assembly 400 includes Hall Effect sensor 301, crank position sensor sleeve 205, and eight magnets 212 evenly spaced around the perimeter of crank position sensor sleeve 205. In one embodiment, Hall Effect sensor 301 is mounted to logic board 207. In other embodiments, Hall Effect sensor 301 is coupled to logic board 207 through electrical interconnects, such as wires or a flex cable.

In one embodiment, eight magnets 212 are mounted within holes that are fabricated to be evenly spaced around the perimeter of crank position sensor sleeve 205. Crank position sensor sleeve 205 rotates with an inner race of drive side bottom bracket bearing 201. Drive side bottom bracket bearing 201 is mounted in drive side inner bearing cup 202, which is not shown for clarity in FIG. 4. Crank spindle 210 can be positioned for operation by sliding through crank position sensor sleeve 205. Crank spindle 201 is connected to crank arms 101. This complete assembly rotates with crank spindle 210 as the cyclist pedals crank arms 101.

In one embodiment, a calibration position is established by orienting crank position sensor sleeve 205 relative to a crank arm 101. In general, crank arms 101 can be aligned to bisect two magnets. Position is determined as crank position sensor sleeve 205 rotates with crank arm 101 and crank spindle 210, causing magnets 212 to travel past Hall Effect sensor 301. A new rotational position value for crank spindle 210 is detected as a magnet 212 passes sufficiently close (next to) Hall Effect sensor 301. In one embodiment, Hall Effect sensor 301 and logic board 207 are fixed to inner sleeve 203 (not shown in FIG. 4 for clarity).

Figure 5A:
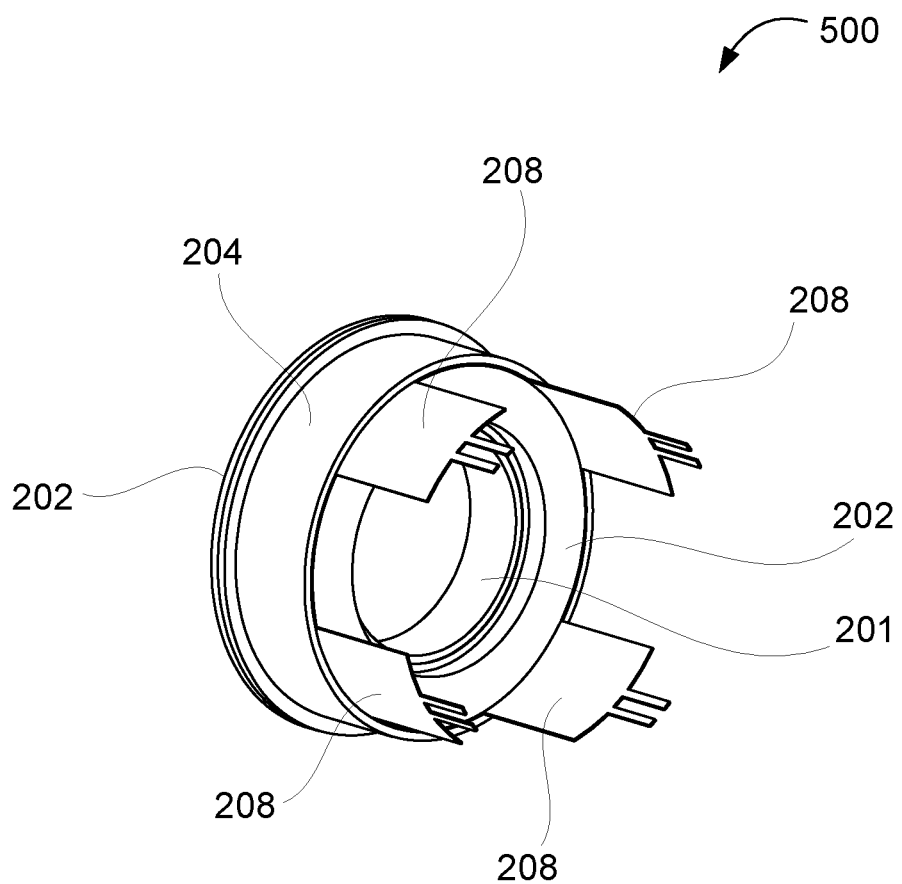
FIG. 5A is a detailed view of a bearing sensor assembly, according to some embodiments.

FIG. 5A is a detailed view of a bearing sensor assembly 500, according to some embodiments. In one embodiment, bearing sensor assembly 500 includes four load sensors 208, spaced evenly around an open volume (e.g., annulus volume) between drive side inner bearing cup 202 and drive side outer bearing cup 204. Additionally, drive side inner bearing cup 202 supports drive side bottom bracket bearing 201. The drive side outer bearing cup 204 is pressed into frame bottom bracket shell 105. Applied loads from either crank arm 101 are detected by load sensors 208. Using crank spindle 210 position and crank spindle 210 velocity measurements, the contributions from crank arms 101, and therefore, each cyclist leg can be separately calculated. In certain embodiments, drive side inner bearing cup 202 and drive side outer bearing cup 204 include mutually-parallel flat sections that span portions of respective perimeter geometry. In such embodiments, load sensors 208 can be fabricated to be substantially planar and are mounted within an open volume formed between the flat (planar) sections.

In one embodiment, load sensors 208 comprise thin film load sensors. Conventional thin film load sensors include a resistive element laminated between two plastic films, with the resistive element configured to exhibit higher electrical resistance in an unloaded state and decreasing resistance as load increases. Conventional thin film load sensors are generally not completely linear in their electrical response to applied force. To account for any nonlinearity, a formula or look up table can be used to map a measured electrical (e.g., resistance) value to a force value.

In an exemplary calibration process, known loads within an anticipated operating range are applied to a load sensor 208, and corresponding ADC outputs are recorded to generate a sensor calibration curve. In one embodiment, power measurement system 200 is coupled to a dynamometer and subjected to a range of different mechanical torque and/or velocity and power inputs. Measurement data from the dynamometer can be recorded as physically accurate reference data in conjunction with direct sensor measurement data from power measurement system 200. In such an embodiment, the sensor calibration curve is defined by a correlation between the direct sensor measurement data and the physically accurate reference data. A sample sensor calibration curve is plotted in FIG. 7, discussed further herein, which indicates measured force (load) as a function of a measured ADC value. Formula coefficients can be calculated to fit the plotted data using conventional curve-fitting techniques, or a lookup table can be generated based on measured calibration data.

Although a specific type load sensor is described herein, alternative load sensor devices and/or electrical behavior of load sensor devices can be implemented without departing from the scope and spirit of embodiments of the present disclosure. One exemplary conventional thin film load sensor is manufactured by Tekscan® under the product name Flexiforce™ A201. This product is approximately one hundredth of an inch (0.010") thick and provides suitable sensitivity over a force range corresponding to a power stroke generated by a human pressing against a bicycle pedal.

Figure 5B:
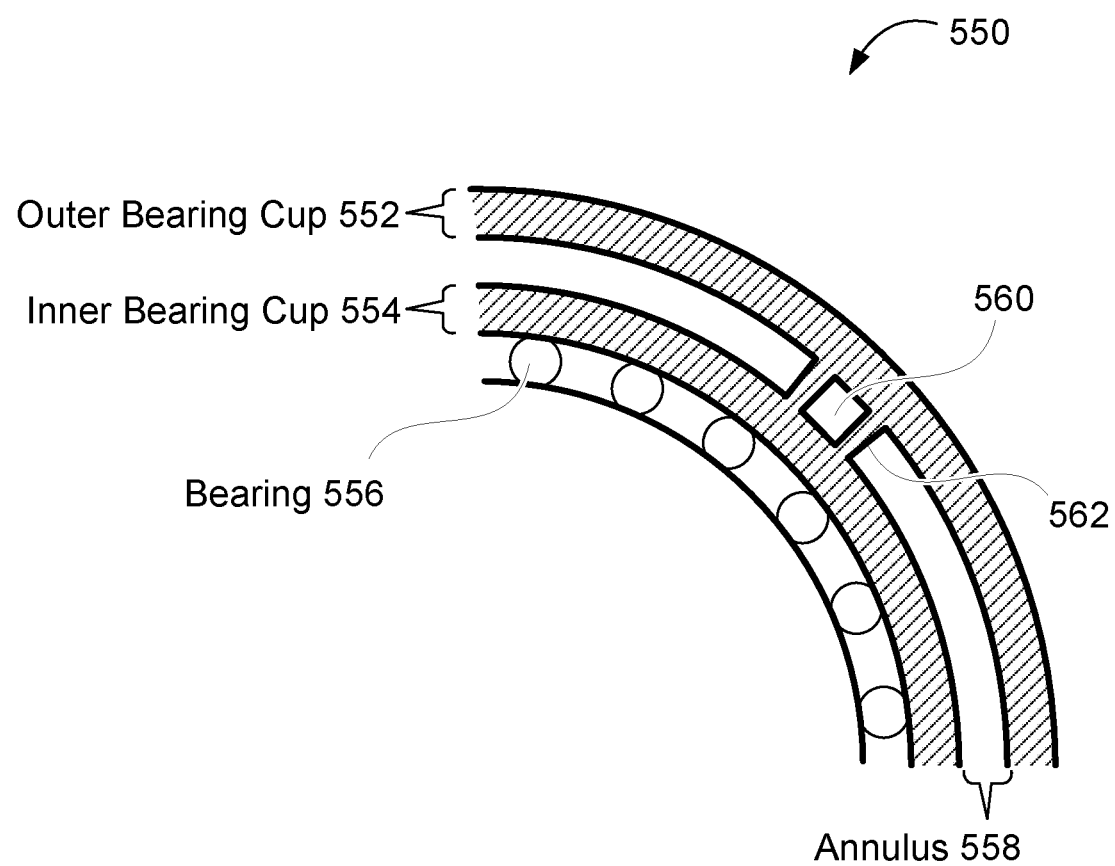
FIG. 5B is a detailed view of an alternative bearing sensor assembly, according to some embodiments.

FIG. 5B is a detailed view of an alternative bearing sensor assembly 550, according to some embodiments. As shown, an outer bearing cup 552 is coupled to an inner bearing cup 554 through a strain block 562. A strain gauge 560 is coupled to strain block 562 and configured to measure strain exhibited by strain block 562. In one embodiment, strain gauge 560 is responsive to directionally specific strain. In one embodiment, outer bearing cup 552 is drive side outer bearing cup 204 and inner bearing cup is drive side inner bearing cup 202. In such an embodiment, strain gauge 560 is responsive to bearing reaction force values, such as bearing reaction force values measured by load sensors 208.

In this way, strain gauges 560, coupled to strain blocks 562, can be substituted for load sensors 208. In one embodiment, strain block 562 is fabricated as a discrete component and configured to couple outer bearing cup 552 to inner bearing cup 554. In an alternative embodiment, strain block 562 is fabricated as part of a single component that includes outer bearing cup 552 and inner bearing cup 554.

Figure 6:
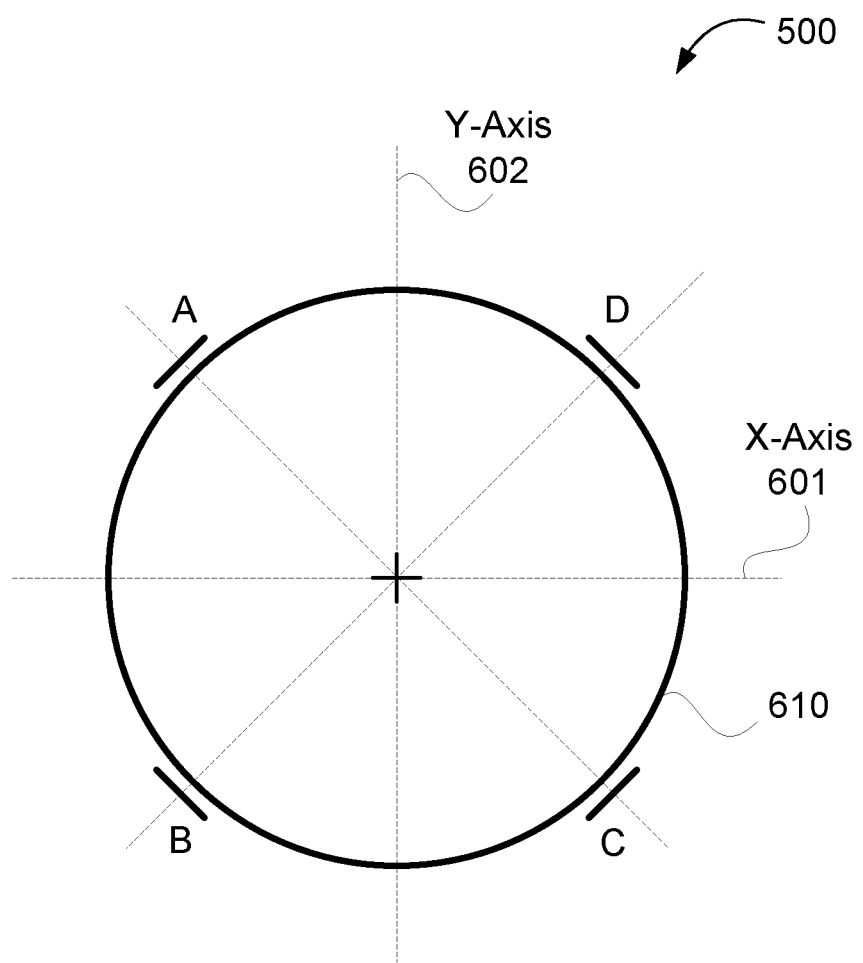
FIG. 6 illustrates a sensor array configuration for a power measurement system, according to some embodiments.

FIG. 6 illustrates a sensor array configuration 600 for bearing sensor assembly 500, according to some embodiments. In one embodiment, bearing sensor assembly 500 includes four load sensors 208, spaced evenly around a measurement perimeter 610 that corresponds to an outer perimeter of drive side inner bearing cup 202. For reference, an x-axis 601 and a y-axis 602 are shown within a plane that is perpendicular to central axis 302. A sensor 208 is located at positions shown as A, B, C, and D. In certain embodiments, bearing sensor assembly 550 is configured according to sensor array configuration 600, with strain gauges 560 disposed in positions A, B, C, and D.

In one embodiment, logic board 207 includes an ADC, configured to measure force at load sensors 208. To measure force at a load sensor 208, an electrical value from the load sensor 208 is sampled by the ADC to generate a digital value, which is mapped to a measured force value using an equation with calibrated coefficients or a lookup table comprising calibration measurements for the load sensor 208. In one embodiment, the equation is used to calculate a force value using the digital value as an input variable. In another embodiment, the digital value is used as a lookup index into the lookup table (or other data structure), which provides a force value output.

Load sensors 208 are generally designed to measure compressive loads. However, some tensile load can be detected as a preload is removed from a particular sensor. Applying a load to the crank assembly in the direction of a particular load sensor 208 (for example, load sensor 208 at location A) slightly shifts drive side inner bearing cup 202 in that direction. This shift removes preload on the opposite load sensor 208 (for example, load sensor 208 at location sensor C), which reads as tensile force measured. The detectable range of tensile force is limited to the preload in bearing sensor assembly 500; thus, the primary purpose of load sensors 208 is to measure compressive load in a particular direction.

Figure 7:
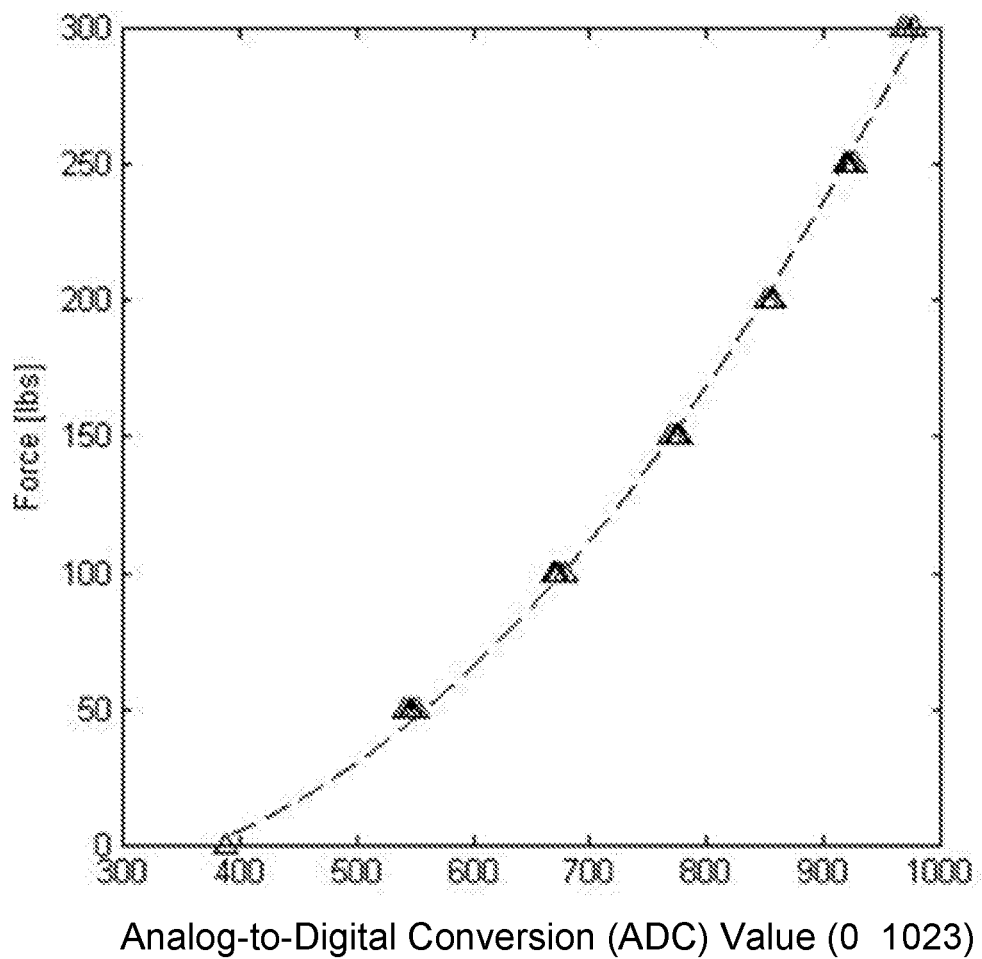
FIG. 7 illustrates an exemplary sensor calibration curve, according to some embodiments.

FIG. 7 illustrates an exemplary sensor calibration curve, according to some embodiments. A force, measured in pounds (lbs), applied to load sensor 208 can produce a non-linear electrical response, which results in an ADC digital output value (e.g., ADC value) having a non-linear relationship to the applied force. The non-linear relationship can be accounted for using the sensor calibration curve. For example, a force applied to a load sensor 208 results in a particular ADC value, indicated along the horizontal axis of a sensor calibration curve. This ADC value maps directly to a measured force value, indicated along the vertical axis, through the sensor calibration curve. Discrete calibration points (e.g., shown here at zero pounds, fifty pounds, one hundred pounds, and so forth) can be determined for a particular load sensor 208 during a calibration operation. The discrete calibration points establish a sensor calibration curve over an operational range for load sensor 208.

In one embodiment, the sensor calibration curve is represented as a set of coefficients that are curve fit to an appropriate calibration curve equation. A given ADC value measured from a load sensor 208 can be used as an input variable to the calibration curve equation to calculate a measured force value. In other embodiments, the sensor calibration curve is represented as a set of lookup table entries. A given ADC value is used as an index into the lookup table. In certain embodiments, interpolation can be performed between different lookup table entries for higher resolution. For example, higher-order bits of an ADC value can be used as a lookup table index, while lower-order bits of the ADC value can be used to provide an interpolation weight between lookup table values.

Data measured and plotted for an exemplary test scenario are given in FIGS. 8 through 12. The data plotted in FIG. 8 through FIG. 12 were measured during the same time interval where a cyclist was beginning to pedal from a resting position (zero rotational velocity).

Figure 8:
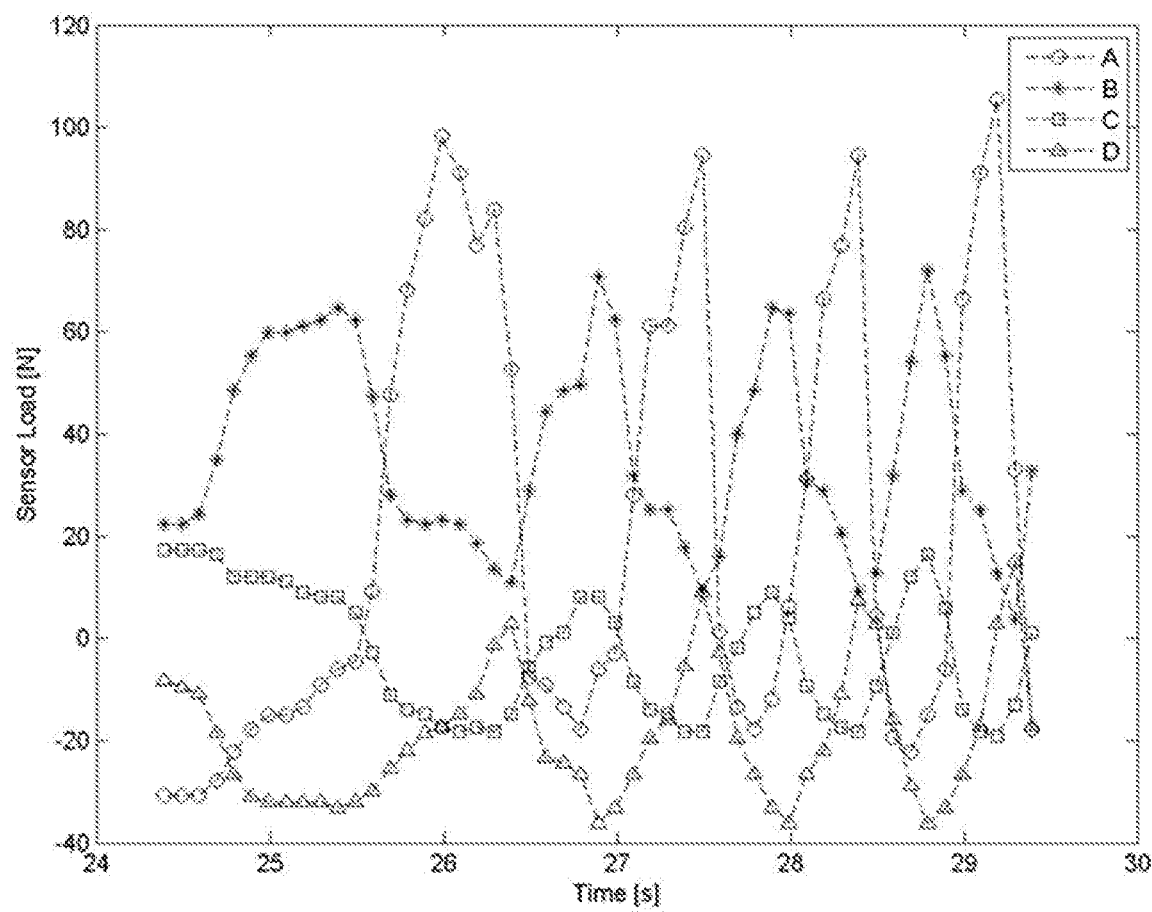
FIG. 8 is a plot of exemplary force measurements sampled from four load sensors during sequential crank rotations, according to some embodiments.

FIG. 8 is a plot of exemplary force measurements sampled from four load sensors 208 during sequential crank rotations, according to some embodiments. In one embodiment, the force measurement values are calibrated according to a sensor calibration curve. As shown, measured force exhibits a cyclic trend consistent with each revolution of the crank assembly as the cyclist pedals at increasing rotational velocity.

Larger peak loads are present at sensors A and B since chain force or tension in the chain results in compressive load at sensors A and B. Although similar tensile load would be expected at sensors C and D, specific construction details of this exemplary implementation limit the devices ability to measure tensile load.

Figure 9:
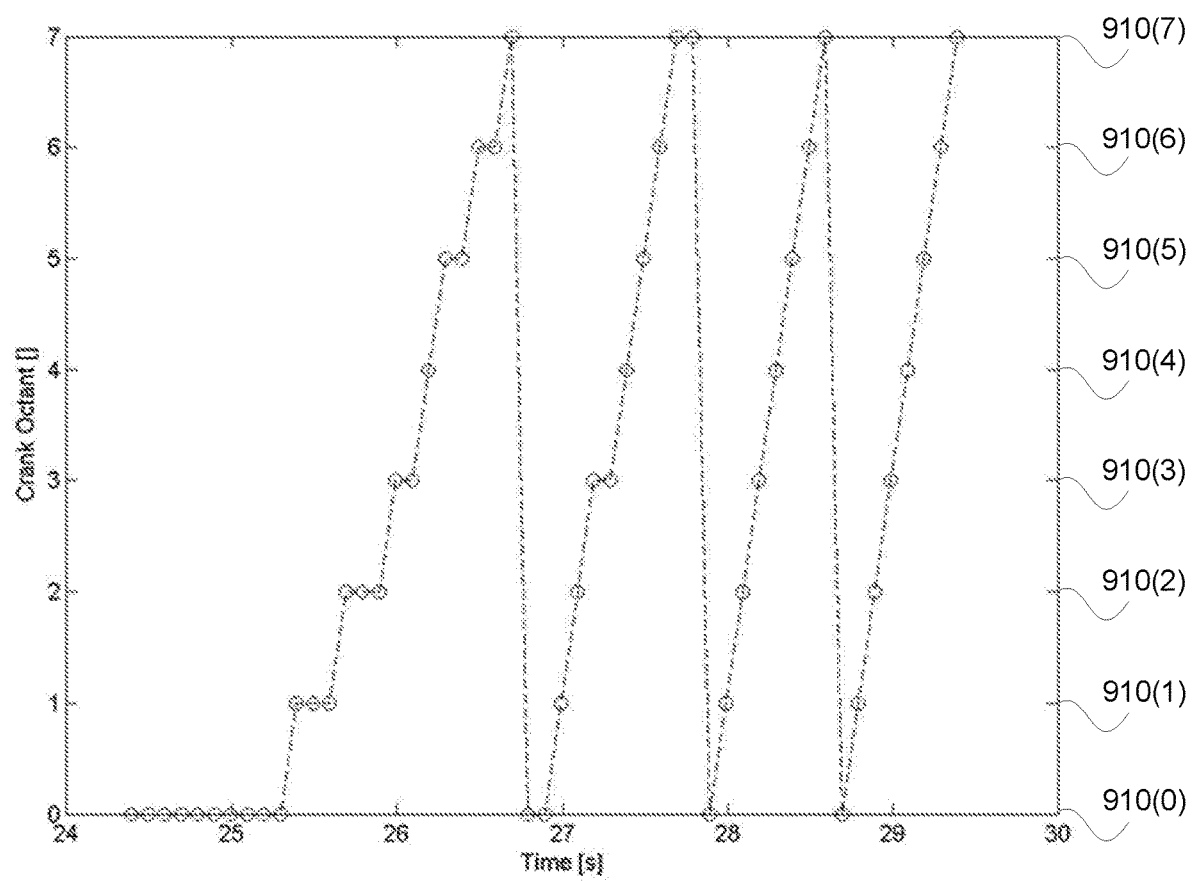
FIG. 9 is a plot of exemplary angular position samples taken during sequential crank rotations, according to some embodiments.

FIG. 9 is a plot of exemplary angular position sensor readings sampled during sequential crank rotations, according to some embodiments. Rotational position is labeled with respect to eight different rotation detection points 910 or crank octants, corresponding to each of eight different magnets 212. At detection point 910(0) a first of magnets 212 is aligned with Hall Effect detector 301, triggering a detection signal from Hall Effect detector 301 that indicates crank spindle 210 is rotated to zero degrees in a rotation path of crank spindle 210. At detection point 910(1), a second of magnets 212 is aligned with Hall Effect detector 301, indicating crank spindle 210 is rotated to forty-five degrees, and so forth. At detection point 910(7), crank spindle 210 is rotated to three-hundred fifteen degrees. The next forty-five degrees of rotation returns the crank spindle 210 to zero degrees of rotation. As crank spindle 210 rotates, magnets 212 are successively detected by Hall Effect detector 301. As successive detection signals are received by circuitry within logic board 207, a rotational position register (e.g., a counter) is incremented, starting at zero and wrapping around back to zero after a count of seven.

In one embodiment, the angular (rotational) position is measured using a single Hall Effect sensor 301 that detects proximity of a magnetic field during rotation of a series of eight magnets 212, which are spaced evenly around crank position sensor sleeve 205. Starting from a known home position, with the crank horizontal (in octant 0), circuitry within logic board 207 tracks magnets 212 as they pass Hall Effect sensor 301. The circuitry updates a current angular position for crank spindle 210 and therefore crank arms 101. In one embodiment, software executing on a processor on logic board 207 increments the angular position of crank arms 101 each time a magnet 212 is detected by Hall Effect sensor 301, returning the angular position back to zero upon completing a full rotation. As the crank velocity increases, slope of the angular position curve becomes steeper. Any technically feasible technique can be implemented to detect a zero rotation position/orientation, including interpolating between peak force values (occurs when crank arms 101 are horizontal).

In one embodiment, the cyclic nature of the load sensor data is used to determine the orientation of the bottom bracket. In light of the teachings provided herein, persons of ordinary skill in the art will understand that various algorithms can be configured to detect peak force and corresponding rotational positions (phase) on each of the load sensors 208. Using the peak load phase, an orientation of the load sensor array can be determined with respect to the chain force and crank arm position. In this way, rotational position can be determined dynamically. Furthermore, time intervals measured between detected peaks can be used to determine angular velocity. In one embodiment, a reciprocal function of duration for each time interval provides average angular velocity during the time interval. In another embodiment, an average frequency of a signal generated using detected peaks provides an average angular velocity.

Figure 10:
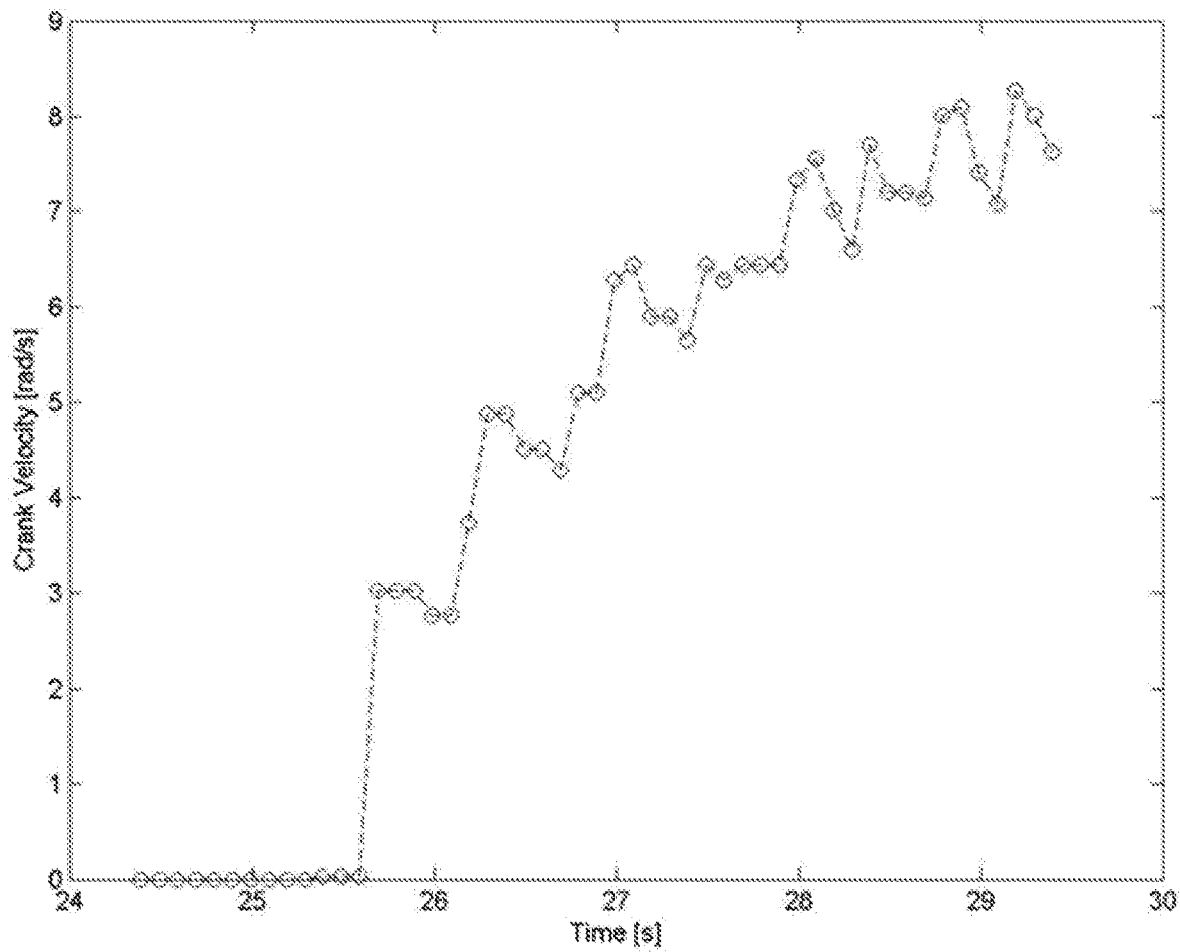
FIG. 10 illustrates exemplary angular velocity samples measured from angular position data, according to some embodiments.

FIG. 10 illustrates exemplary angular velocity measured from angular position data sampled during sequential crank rotations, according to some embodiments. In one embodiment, logic board 207 is configured to calculate angular velocity for crank spindle 210 based on a signal from Hall Effect sensor 301. Angular velocity is proportional to the angular distance between magnets 212, divided by the time passage between magnet 212 detections at Hall Effect sensor 301. Consequently, an updated real-time angular velocity value can be calculated each time a magnet is detected as a direct function of time passage from the previous magnet being detected.

Figure 11:
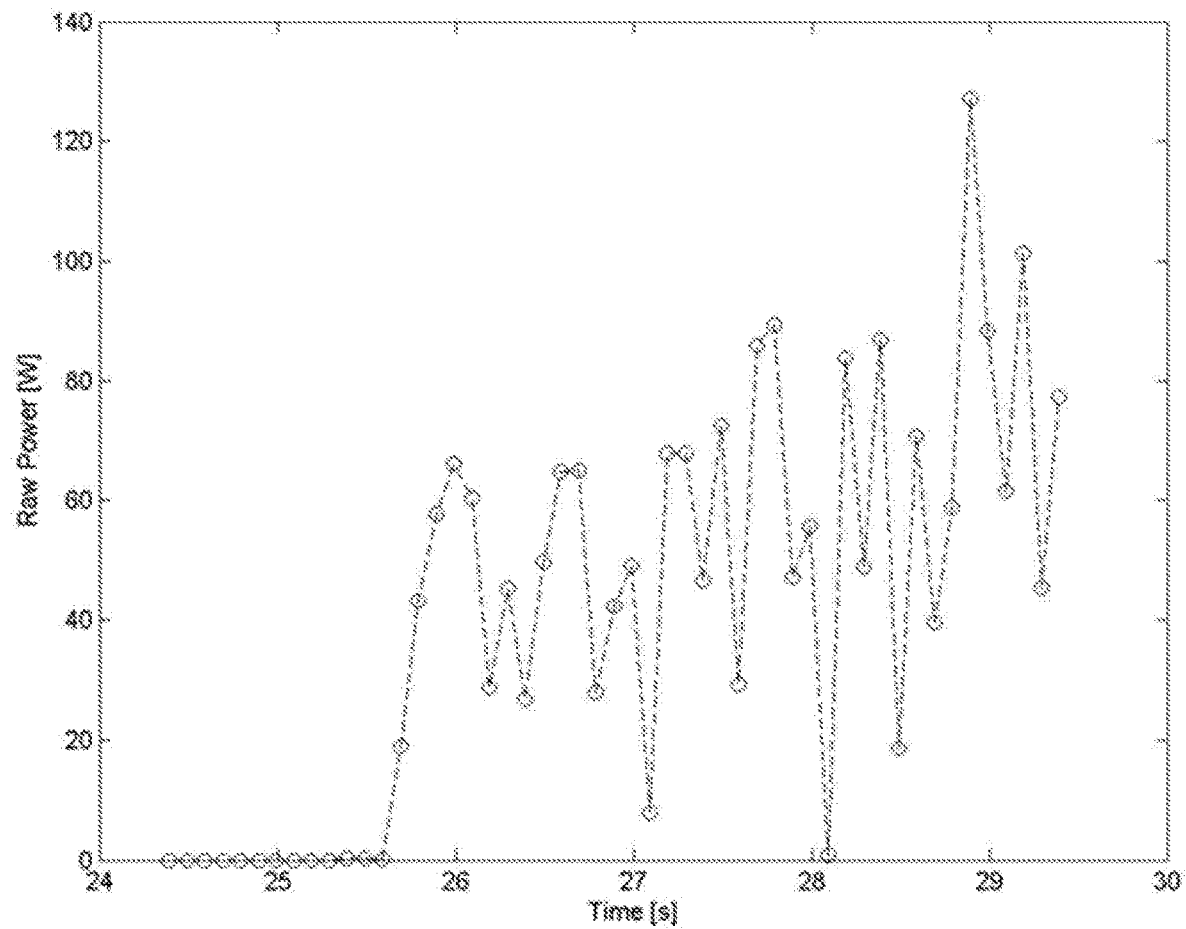
FIG. 11 illustrates exemplary measured power values, according to some embodiments.

FIG. 11 illustrates exemplary measured power values, according to some embodiments. The measured power values are calculated using underlying physical measurements of force values, position values, and rotational velocity values that are sampled during sequential crank rotations. In one embodiment, power is calculated according to Equation 1.

$$\text{Power} = \text{Torque} \times \text{Velocity} \quad \text{(Equation 1)}$$

In one embodiment, the torque variable of Equation 1 is calculated as described herein using force measurements from load sensors 208, and the velocity variable is calculated using time intervals between successive magnet detection events at Hall Effect sensor 301.

In one embodiment, mechanical power is transmitted through the drivetrain and indirectly measured using the angular velocity of the crank spindle 210 (which is the same for all rotating parts 101, 106, 205, 210, 212) in combination with the moment (torque) applied to the drive sprocket 106 by the chain force. However, the torque is also indirectly measured using a simplified force balance of the crank and bottom bracket assembly. The simplified force balance requires that all forces applied to the bottom bracket assembly must be balanced. Force balance at the bottom bracket assembly is illustrated in FIG. 13.

Figure 12:
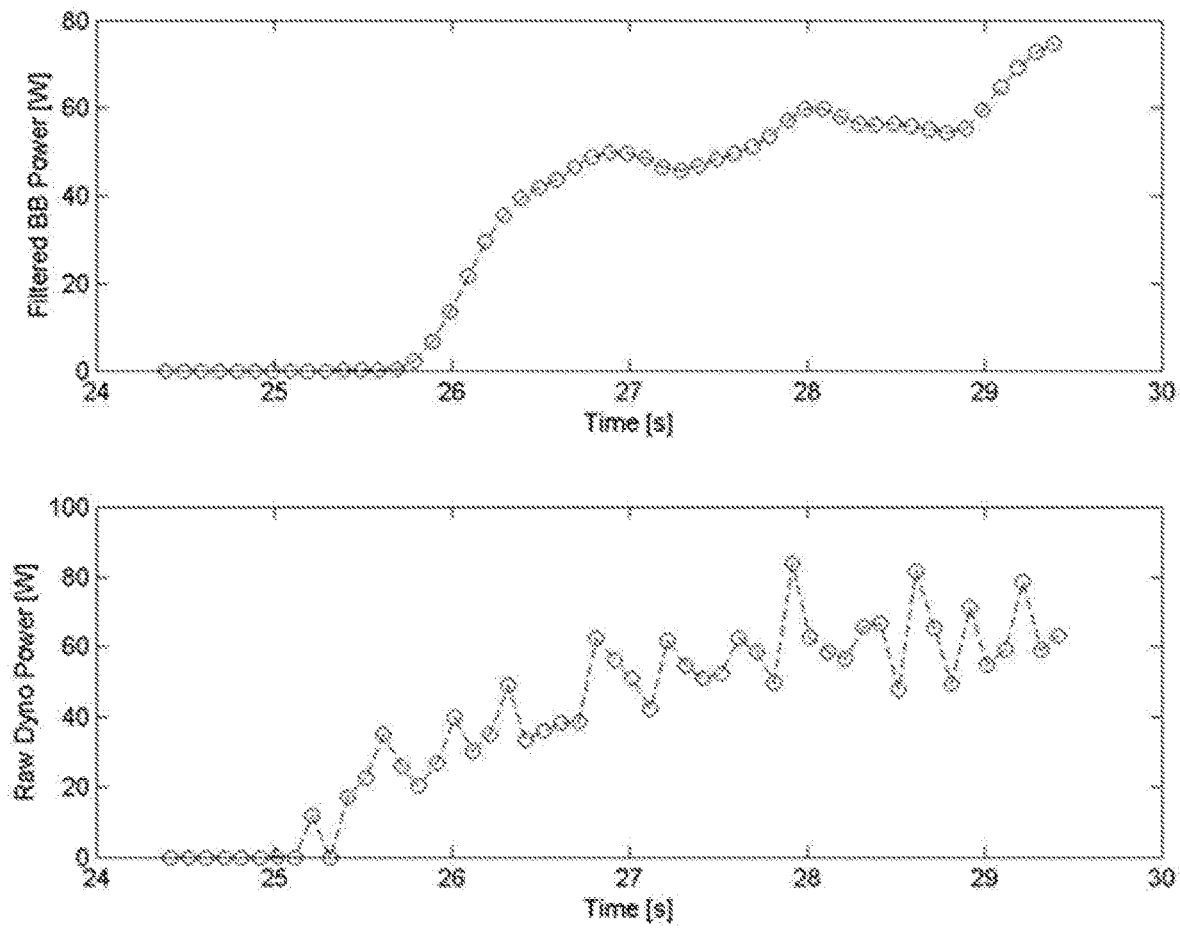
FIG. 12 illustrates a comparison between power values measured using techniques disclosed herein and directly measured power from a calibrated dynamometer, according to some embodiments.

FIG. 12 illustrates a comparison between power values measured using techniques disclosed herein and directly measured power from a calibrated dynamometer, according to some embodiments.

In one embodiment, power is measured using techniques disclosed herein to produce sequential power values. The sequential power values are then filtered using, for example, a conventional second order Butterworth filter to produce a smoother, more representative power output, shown in the upper plot (Filtered BB Power). Readings from a dynamometer in the same system are shown in the lower plot (Raw Dyno Power). As shown, the filtered plot in the upper graph is more intuitive and representative of cyclist power output and effort.

Figure 13:
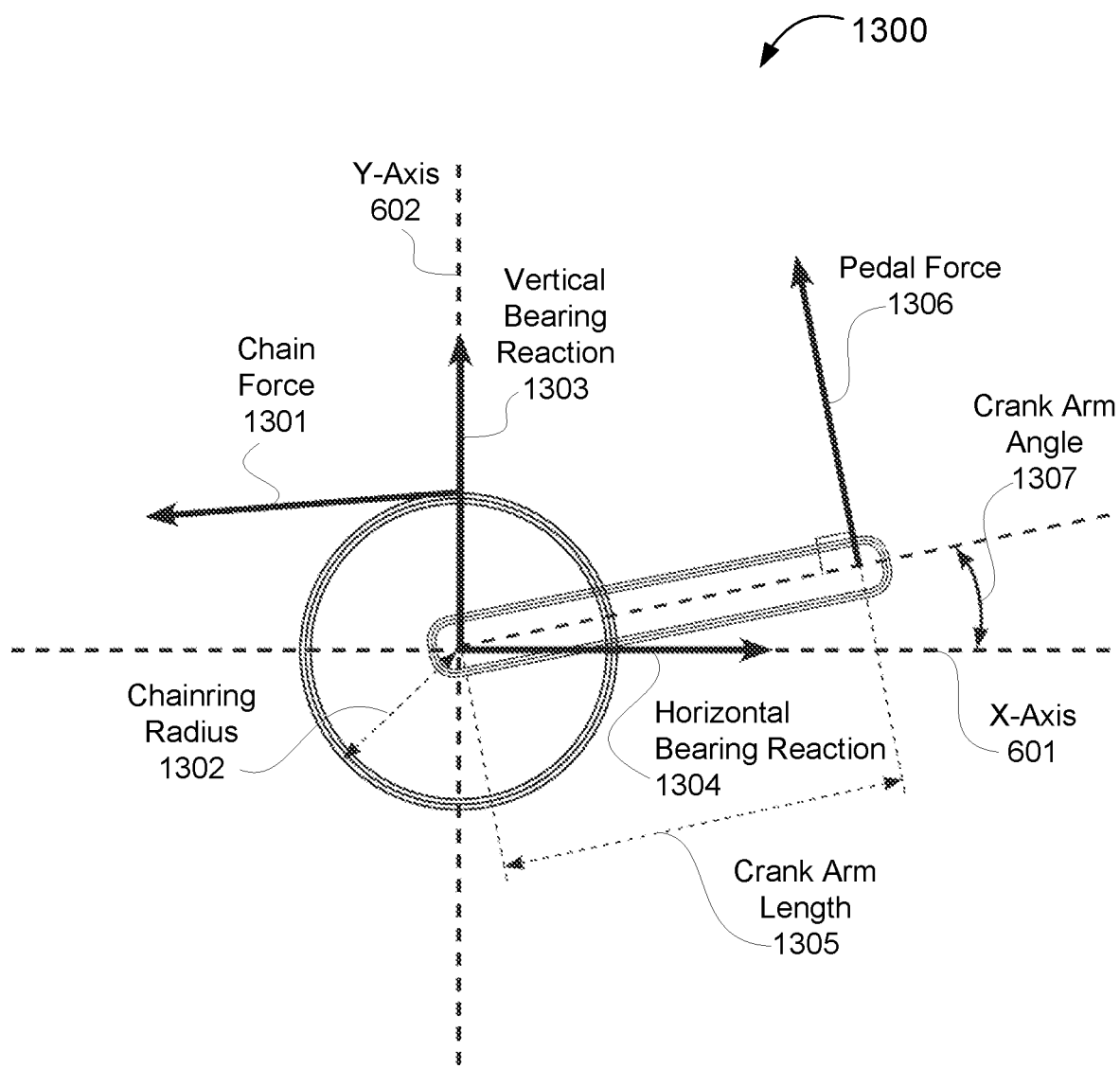
FIG. 13 illustrates a crank and chainring free-body diagram for calculating torque about a bottom bracket bearing axis, according to some embodiments.

FIG. 13 illustrates a crank and chainring free-body diagram 1300 for computing torque about a bottom bracket bearing axis (central axis 302), according to some embodiments. A three-dimensional assembly comprising drive side bottom bracket bearing 201, non-drive side bottom bracket bearing 211, and crank arms 101 coupled to crank spindle 210 simplify to form a two-dimensional free-body diagram, as depicted by free-body diagram 1300.

A plane is defined by x-axis 601 and y-axis 602, with a central axis 302 (not shown) orthogonally intersecting at the intersection point of x-axis 601 and y-axis 602 (origin). A chainring comprises teeth disposed around the perimeter of drive sprocket 106, which is configured to rotate about central axis 302. A chainring radius 1302 defines an effective radius for the chainring. A crank arm length 1305 defines an effective moment arm length for crank arms 101. A crank arm angle 1307 defines an effective angle of rotation for a crank arm 101. In one embodiment, crank arm angle 1307 corresponds to an angular position for crank spindle 210. In certain embodiments, angular position is measured with respect to fixed components of an associated bicycle frame (e.g., chain stay tubes 104). In other embodiments, angular position is measured with respect to a gravity vector. For example, a crank arm angle 1307 of zero may be perpendicular to a gravity vector.

Forces operating within free-body diagram 1300 are shown to include, without limitation, pedal force 1306, vertical bearing reaction 1303, chain force 1301, and horizontal bearing reaction 1304. In one embodiment, four load sensors 208 are configured to measure forces applied to crank spindle 210 relative to central axis 302. For example vertical bearing reaction 1303 can be measured using the four load sensors 208. Crank arm angle 1307 can be measured using the techniques disclosed herein, or any other technically feasible technique for measuring a rotational angle.

Forces on each crank arm 101 are assumed to produce similar bearing reactions. Consequently, in one embodiment, only one crank arm 101 is considered in free-body diagram 1300.

Focusing on the vertical force balance, Equation 2 is obtained for calculating torque due to a cyclist pressing on pedals attached to crank arms 101. Equation 2 makes three assumptions, including the chain force acts in the horizontal direction, the pedal force acts perpendicular to crank arm 101, and the crank assembly components have no inertia. In one embodiment, torque is calculated according to Equation 2.

$$\text{Torque} = \frac{\text{Vertical Bearing Reaction}}{\sin\left(\frac{\pi}{2} + \text{Crank Arm Angle}\right)} * \text{Crank Arm Length} \quad \text{(Equation 2)}$$

Vertical bearing reaction 1303 (force) can be measured in real time using load sensors 208, real-time crank arm angle can be measured using the techniques disclosed herein or any other techniques. Crank arm length is typically a fixed value.

In one embodiment, circuitry comprising a microprocessor (or microcontroller) within logic board 207 is configured to cause force measurements to be performed, such as by commanding an ADC (e.g., ADC 1504 of FIG. 15) to digitize analog signals from load sensors 208 into corresponding ADC samples (digital values). The microprocessor is configured to receive and process the ADC digital values into force values using an appropriate sensor calibration curve, as described herein. Furthermore, the microprocessor is configured to cause rotational position measurements to be performed using Hall Effect sensor 301 and a rotational position register. Rotational position values having eight different values (eight quantization levels) can be used directly from the rotational position register; however, additional rotational position resolution can be obtained by interpolation for a specific sample time. Additionally, the microprocessor is configured to calculate torque values. In one embodiment the microprocessor calculates torque values according to Equation 2, by plugging in the force values and the rotational position values. In one embodiment, the microprocessor is further configured to calculate power according to Equation 1, using the calculated torque values and a rotational velocity value. In one embodiment, the rotational velocity value is calculated using a reciprocal function of time intervals between Hall Effect sensor 301 detection signals generated at different rotation detection points 910. In certain embodiments, software executing within the microprocessor is configured to distinguish left from right leg power based on crank arm angle 1307. In one embodiment, software and/or firmware is included in logic board 207 for processing data measured data into usable cyclist information. For example, load sensor data and position data can be processed into power output for a cyclist to read.

Figure 14:
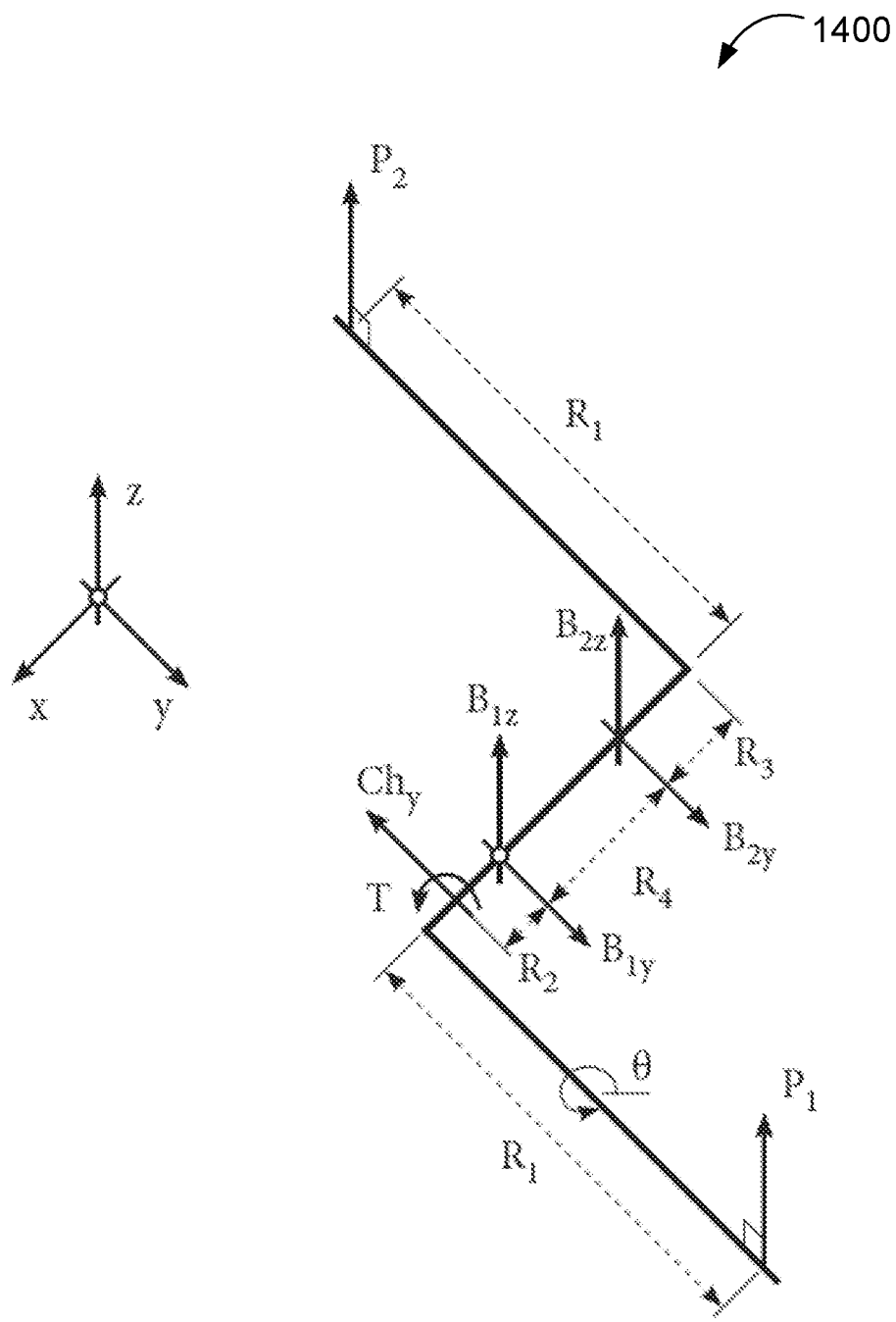
FIG. 14 illustrates an alternative free-body diagram, according to some embodiments.

FIG. 14 illustrates an alternative free-body diagram 1400, according to some embodiments. Alternative free-body diagram 1400 models greater detail compared to the simpler two-dimensional free-body diagram 1300 presented in FIG. 13. In particular alternative free-body diagram 1400 models crank arms 101, crank spindle 210 coupled to the crank arms 101, drive side bottom bracket bearing 201, and non-drive side bottom bracket bearing 211. Assumed in alternative free-body diagram 1400 is that the cyclist exerts pedal forces P1 or P2 perpendicularly to the crank arms 101, that axial forces on crank spindle 210 can be neglected, and that drive sprocket 106 with applied chain force could be replaced by the moment (torque) T and horizontal force $Ch_y$. As shown, $R_1$ is a crank arm 101 length, $R_2$ is the distance between drive side bottom bracket bearing 201 center and a chain line force in the x-direction, $R_3$ is the distance between a non-drive side bottom bracket bearing 211 center and a center of the pedal force in the x-direction, and $R_4$ is the distance between a center of drive side bottom bracket bearing 201 and non-drive side bottom bracket bearing 211. Performing a force and moment balance using this diagram provides an alternative formula for relating the bearing loads to the chainring torque. The torque in this approach is given by Equation 3. The term $B_{1Z}$ refers to a vertical (z-axis) bearing reaction force for a first bearing on the same side as $P_1$. The term and the term $B_{1Y}$ refers to a horizontal (y-axis) bearing reaction force (e.g., along the direction for forward motion of a bicycle) for the first bearing. Similarly, the term $B_{2Z}$ refers to a vertical bearing reaction force and the term $B_{Y2}$ refers to a horizontal bearing for a second bearing on the same side as $P_2$. Torque is shown as T. This value of torque assumes the cyclist is applying a power stroke at P1. Crank arm angle is given by $\theta$.

$$\text{Torque} = \frac{B_{1z} R_4 \left( R_1 \cos(\theta) \sin\left(\frac{\pi}{2} + \theta\right) - R_1 \cos\left(\frac{\pi}{2} + \theta\right) \sin(\theta) \right)}{R_3 \sin\left(\frac{\pi}{2} + \theta\right) + R_4 \sin\left(\frac{\pi}{2} + \theta\right)} \quad \text{(Equation 3)}$$

In one embodiment, circuitry comprising a microprocessor (or microcontroller) within logic board 207 is configured to perform force and rotational position measurements, as well as calculating torque according to Equation 3 using the force and rotational position measurements. In one embodiment, the circuitry is further configured to calculate power in accordance with Equation 1, using the calculated torque from Equation 3 and a measured rotational velocity. In certain embodiments, software executing within the microprocessor is configured to distinguish left from right leg power based on crank arm angle.

Figure 15:
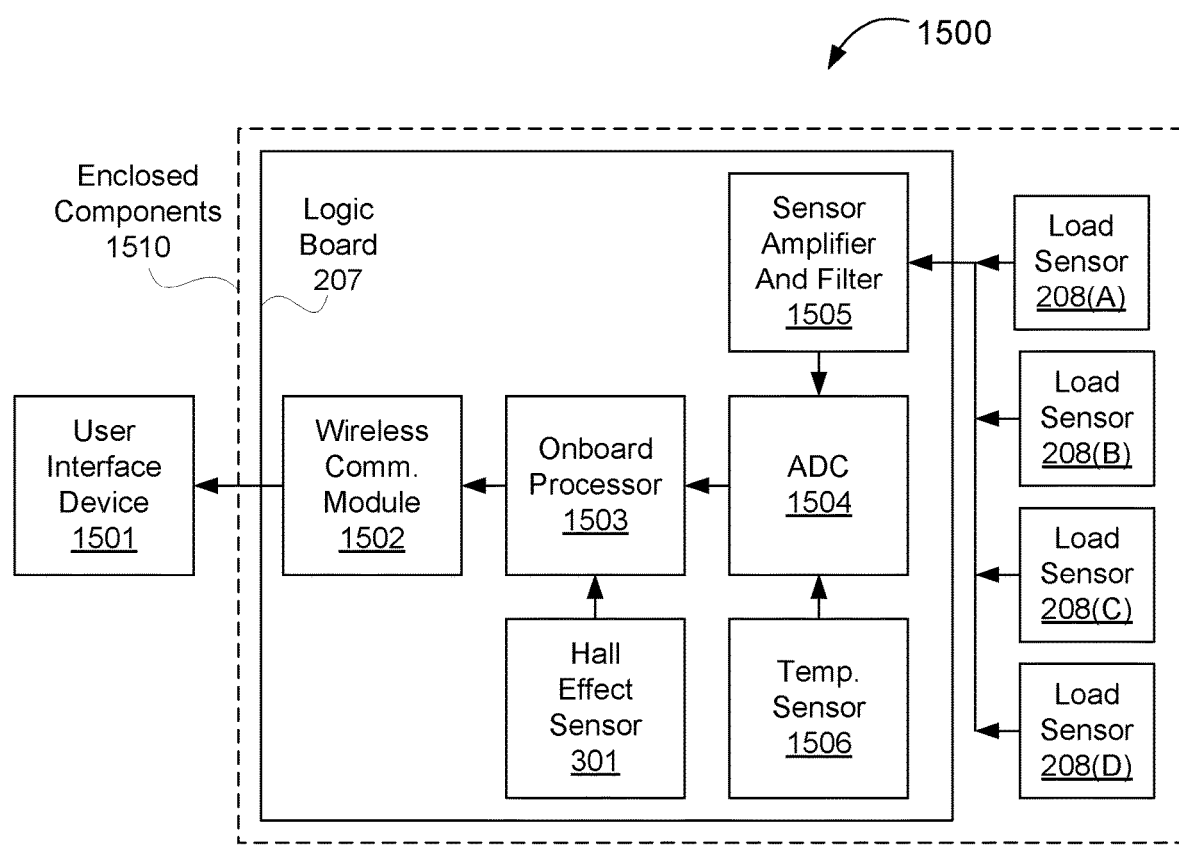
FIG. 15 illustrates an electronic system configured to perform one or more techniques disclosed herein, according to some embodiments.

FIG. 15 illustrates an electronic system 1500 configured to perform one or more techniques disclosed herein, according to some embodiments. As shown, electronic system 1500 includes logic board 207 and load sensors 208. Logic board 207 includes a wireless communication module 1502, Hall Effect sensor 301, an onboard microprocessor 1503 (e.g., Atmel 328P), a temperature sensor 1506, and a load sensor amplifier and filter 1505. In one embodiment, onboard microprocessor 1503 includes an onboard ADC 1504. In another embodiment, ADC 1504 is implemented as a discrete circuit. ADC 1504 processes voltage signals from the load sensors 208 and temperature sensor 1506 for use by microprocessor 1503. Load sensors 208 and battery 209 are electrically connected to logic board 207, such as by wires. In one embodiment, logic board 207, load sensors 208, and battery 209 are contained inside the bicycle bottom bracket shell 105. A user interface device 1501 is mounted separately outside of the bicycle bottom bracket shell 105. Wireless communication module 1502 on logic board 207 communicates between logic board 207 and user interface device 1501, for example to transmit a power value for display on user interface device 1501. In one embodiment wireless communication module is configured to transmit measured real-time power values for display on user interface device 1501.

Load sensor 208 resistance varies as a function of the applied load (force). Supplying load sensors 208 with a reference voltage allows the voltage drop across the load sensors to be measured. In one embodiment, load sensor 208 outputs are amplified using an operational amplifier according to manufacturer's recommendations, with amplification controlled using a digitally variable resistor, which can be set by onboard processor 1503. Onboard processor 1503 reads a load sensor 208 and temperature sensor 1506 inputs by causing ADC 1504 to perform an ADC operation. Load sensor 208 signals are used in power calculation by on board processor 1503. Hall Effect sensor 301 output state is changed as each magnet 212 on crank position sensor sleeve 205 passes the Hall Effect sensor 301 location. As described in further detail herein, an output signal from Hall Effect sensor 301 is used for crank position and crank velocity calculations necessary for power calculations by on board processor 1503. In one embodiment, temperature sensor 1506 changes resistance as a function of the ambient temperature. Also using a reference voltage, the voltage drop across the temperature sensor 1506 can be measured by ADC 1504. Conventional load sensors 208 can vary their output as a function of temperature. In one embodiment, temperature sensor 1506 signal information is used for calibration (temperature) compensation of the load sensor 208 signals. Various calibration curves, similar to FIG. 7, would be created in the desired range of operating temperatures. To calculate a load value (applied force) at a particular temperature, an interpolation would be performed using the calibration curves and the temperature indicated by temperature sensor 1506. In one embodiment, a first calibration curve is defined for a first temperature and a second calibration curve is defined for a second temperature. A given temperature value (e.g., operating temperature for a load sensor 208) between the first temperature and the second temperature is used to interpolate between a first force value provided by the first calibration curve and a second force value provided by the second calibration curve. The interpolation scheme could be nearest, linear, polynomial, or another similar method. In one embodiment, enclosed components 1510 are packaged within bicycle bottom bracket shell 105.

In one embodiment, user interface device 1501 is a separately powered device with a display screen and buttons for user input, as well as changing display output. User interface device 1501 can be mounted on the bicycle or on the cyclist. Existing user interface devices, including the Garmin™ Edge bicycling computers, can be integrated with and/or configured to operate with power measurement system 200. Power measurement system 200 can be configured to transmit digital data (e.g., measured power values) wirelessly to the user interface device 1501. The data can be transmitted via Bluetooth, Low Energy Bluetooth, or ANT+ protocols for example. The data transmitted can include cadence and/or power output, calculated by power measurement system 200. User interface device 1501 displays this data back to the user.

In certain embodiments, user interface device 1501 can be programmed to provide multiple output display variations depending on the rider's preference. These variations could be displayed in a user configured layout on the screen. Exemplary display variations include instantaneous or average right leg power output, instantaneous or average left leg power output, instantaneous total power, maximum power, and average power during a particular time interval. Display examples of cadence measurement include instantaneous cadence, peak cadence, and average cadence during a particular time interval. Power measurement system 200 can also be configured to receive data from user interface device 1501 for setup or calibration.

In one embodiment, power measurement system 200 is installed in bicycle bottom bracket shell 105 of a bicycle frame in the same way typical bottom bracket bearings 201 and 211, crank spindle 210, and crank arms 101 are otherwise installed within a typical bottom bracket shell. Such an installation requires orientation of load sensors 208 and Hall Effect sensor 301 with bicycle frame geometry and components. In this embodiment, power measurement system 200 includes orientation alignment markings for mounting power measurement system 200 with the load sensors 208 and position Hall Effect sensor 301 in an appropriate orientation with respect to frame geometry axis for proper power measurement. Crank arm 101 with crank spindle 210 is also aligned with a marking on crank position sensor sleeve 205. Initial sensor preloads or offsets will be captured automatically by the system on first power on and first communication with the user interface. Such offsets can be used to compensate future measurements.

Various embodiments advantageously provide for installation of power measurement system 200, to provide real-time power measurement, into the bicycle bottom bracket shell 105. Such installation can be performed without modification to existing crank parts or the bicycle frame. The system measures left and right rider leg power output independently as well as total rider power output, has wireless communication to a remote user interface device, and is mounted entirely inside the bicycle bottom bracket. Alternatively, power measurement system 200 can position certain components (e.g., battery 209) external to bicycle bottom bracket shell 105 to facilitate maintenance and/or ease of use.

In one embodiment, load sensors 208 are positioned to surround drive side bottom bracket bearing 201; however, other embodiments can include various combinations of load sensors 208 towards a drive side or non-drive side bearing. In alternative embodiments load sensors 208 are positioned surrounding the non-drive side, only surrounding the drive side, or surrounding the drive side and non-drive side.

In other embodiments, the load sensors are mounted between a bottom bracket bearing and a bearing cup, between a bearing cup and a bicycle bottom bracket shell, between a bottom bracket bearing and a bicycle bottom bracket shell, or anywhere else in a bicycle bottom bracket area that permits detection of the bearing loads.

In composite bicycle frames, the bottom bracket area is heavily filleted and the bottom bracket shell may not be as distinct as the hollow cylindrical shell depicted in this embodiment. In another embodiment, load sensors are embedded into the composite bicycle frame material forming the bottom bracket shell area.

Alternative embodiments can include other load sensor types or designs. In certain embodiments, the load sensor 208 foot print or area required can be customized for a particular application. Load sensors 208 can be put in places not normally accommodated by traditional direct load sensing elements (e.g., load cells, strain gauges). The load sensor 208 can be mounted on a curved surface as shown, or be placed on a machined surface or molded flat surface in the area of desired measurement. The number of load sensors 208 can vary from a single load sensor to many load sensors, or the load sensor could be a single continuous element placed in the open volume (e.g., annulus volume) between drive side inner bearing cup 202 and drive side outer bearing cup 204.

When commercially available thin film type load sensors (e.g., Tekscan Flexi Force A201) are installed on curved surfaces, the film layers tend to delaminate. The observed delaminating effects can be attributed to excessive shear forces between the laminated layers. If the load sensors are to be installed on curved surfaces and a long load sensor life is desired, the plastic film should be formed to match the curved surface before the resistive element is installed and the layers are laminated together. Various methods could be used to form the plastic film to curved surfaces including thermal forming and vacuum forming. The sensing material can be applied before or after the film is formed. Using this method, installing the thin film load sensors on curved surfaces would not induce any shear force between the laminated layers that could damage device integrity. In one embodiment, load sensors 208 are thin film load sensors, fabricated to conform to a curved mounting surface. For example, load sensors 208 can be fabricated to conform in shape to at least an arc section of the open volume between drive side outer bearing cup 204 and drive side inner bearing cup 202. When assembled into place, the load sensors 208 can incur negligible initial loading (offsets). In such an embodiment, load sensors 208 can be fabricated using any of the techniques discussed herein or any other technically feasible fabrication techniques. Of course, in certain other embodiments flat mounting surfaces for load sensors 208 (e.g., facing surfaces of drive side inner bearing cup 202 and drive side outer bearing cup 204) can be fabricated as discussed herein, and flat load sensors 208 can be mounted to the flat mounting surfaces.

In one embodiment, power measurement system 200 is fabricated to operate in different bottom bracket configurations. More specifically, power measurement system 200 can be adapted to any bottom bracket configuration and size. In other embodiments, bottom bracket cups can be configured for various bottom bracket standards including threaded bottom bracket applications and various crank spindle standards. In yet other embodiments, various bearing configurations can be used, including radial cartridge bearings, angular contact cartridge bearings, and traditional cup/cone bearing assemblies.

In one embodiment, drive sprocket 106 includes teeth, configured to mesh with a sprocket engaging a chain (e.g., a bicycle chain), or similar power transmission system. Furthermore, in alternative embodiments a conventional chain drive system comprising a sprocket and a chain is replaced with other power transmission systems employing belts, cables, and/or other serpentine elements with no loss of applicability of power measurement system 200 described herein.

In other embodiments, various sensing techniques and detectable features may be used for quantifying crank position. Such techniques can include optical sensor(s)/emitter(s) and associated detectable features, magnetic strip with alternating poles and associated sensor(s), or sensors to detect the movement of the ball bearings/bearing cage. In one embodiment, a presence sensor is configured to detect proximity of an individual ball (or balls) within a ball bearing. In such an embodiment, the detection feature comprises the individual ball or balls within the ball bearing, and the presence sensor detects proximity of a ball. Any underlying physical proximity measurement can be performed to detect proximity of a ball. Such proximity measurement can include sensing an optical, magnetic (e.g., field presence or permeability change), mechanical, or electrical physical property of the ball in proximity. A detection signal from the presence sensor is used to measure angular position and/or angular velocity. The presence sensor can be positioned at the outer race of the ball bearing and configured to detect proximity of a ball rolling by. A home position or calibration position sensor/detectable feature may also be implemented using any of the previously described techniques or any other technically feasible techniques.

In an alternative embodiment, Hall Effect sensor 301 and magnets 212 are replaced with other features that can be detected optically. Alternatively, various other electronic sensors may be used to detect the position including accelerometers, inertial measurement units, or inductive sensors.

Figure 16:
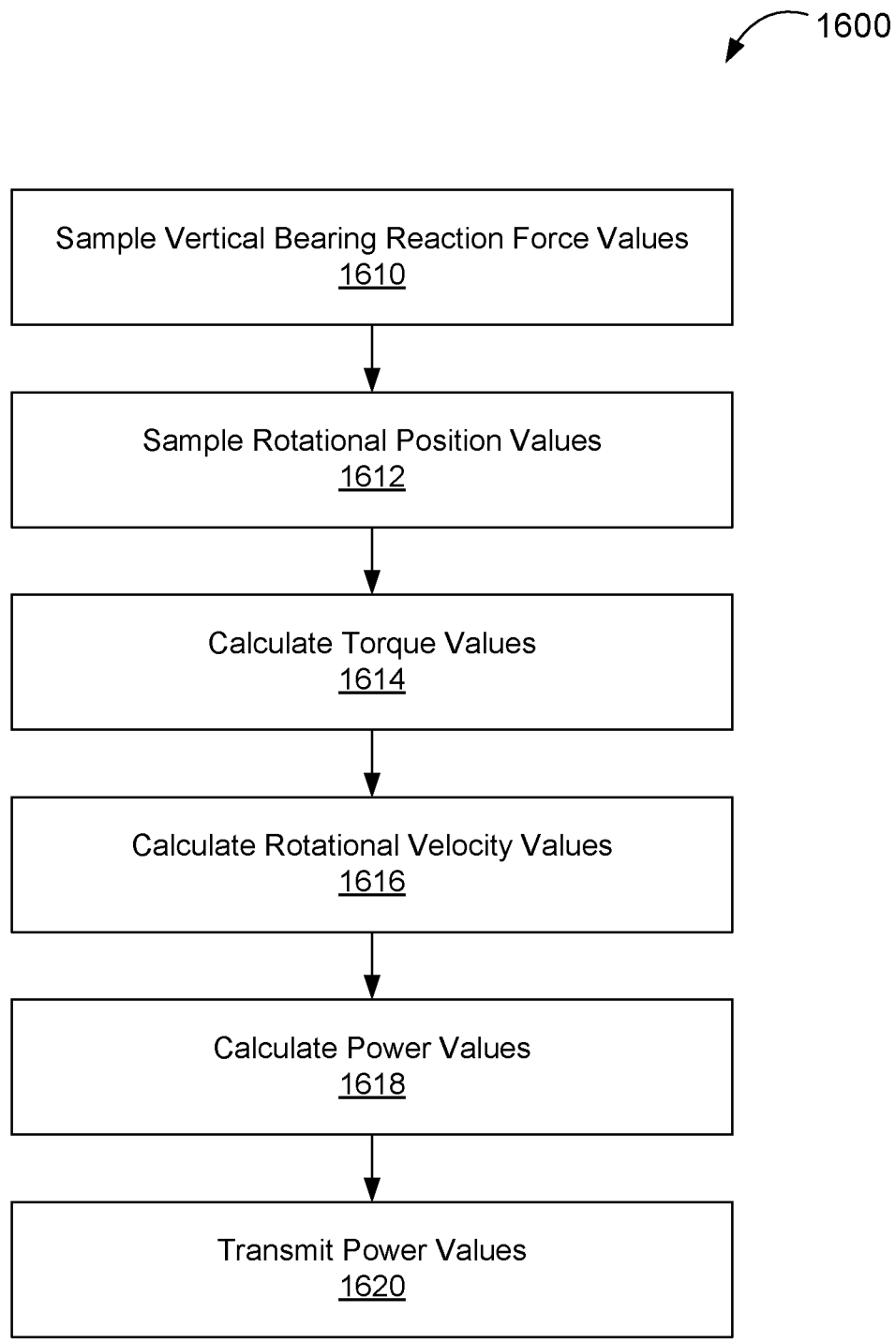
FIG. 16 is a flow chart of a method for measuring power transmitted to a drivetrain, according to some embodiments.

FIG. 16 is a flow chart of a method 1600 for measuring power transmitted to a drivetrain, according to some embodiments. Although method 1600 is described in conjunction with the systems of FIGS. 1-6 and 15, any system that performs method 1600 is within the scope and spirit of embodiments of the techniques disclosed herein. In one embodiment, power measurement system 200 of FIG. 2A, is configured to perform method 1600. Programming instructions for performing method 1600 are stored in a non-transitory computer readable storage medium and executed by a processing unit within power measurement system 200. In one embodiment, the programming instructions comprise a computer program product. In one embodiment, the programming instructions are stored on a non-transitory, non-volatile memory device coupled to logic board 207 and executed by a microprocessor coupled to logic board 207.

Method 1600 begins at step 1610, where power measurement system 200 samples one or more vertical bearing reaction values (e.g., vertical bearing reaction 1303). In one embodiment, electrical analog signals from load sensors 208 are sampled by ADC 1504 to generate corresponding ADC samples. The ADC samples are used as input values to a sensor calibration curve, with force values provided as corresponding outputs. In certain embodiments, sensor amplifier and filter 1505 amplifies and/or filters the electrical analog signals to generate processed analog signals to be digitized by ADC 1504.

As described herein, sensor calibration curves can be implemented using lookup tables or calibration functions (with curve-fit coefficients). In one embodiment, a temperature value is also sampled (e.g., from temperature sensor 1506) and used for temperature compensation of the sensor calibration curves.

At step 1612, power measurement system 200 measures one or more rotational position values (e.g., of crank spindle 210) as described herein. In one embodiment, a rotational position value of crank spindle 210 indicates a rotational position value of crank arms 101. Magnets 212 are positioned to pass by Hall Effect sensor 301 as crank spindle 210 changes rotational position, indicating that crank spindle 210 is in one of a fixed number of sectors of rotation. In one embodiment, eight magnets 212 are used and eight sectors (octants) are detected as discrete rotational position values. A rotational position value between the discrete rotational position values can be calculated by interpolation for a specific time between two previously recorded rotational position value changes, based on a time interval between rotational position value changes and the specific time required for sampling a rotational position. In other embodiments, alternative rotational position sensing is implemented using either incremental or direct measurement techniques.

At step 1614, power measurement system 200 calculates torque values applied through crank arms 101. In one embodiment, power measurement system 200 calculates torque values according to Equation 2. In another embodiment, power measurement system 200 calculates torque values according to Equation 3.

At step 1616, power measurement system 200 calculates rotational velocity values. In one embodiment, time passage intervals are measured between magnets 212 passing by Hall Effect sensor 301, and discrete rotational velocity values are calculated as a direct function (e.g., reciprocal) of the time passage intervals. Interpolation between the discrete rotational velocity values can be used to estimate a rotational velocity value at a specific time. In alternative embodiments, different techniques can be implemented to detect and/or calculate rotational velocity.

At step 1618, power measurement system 200 calculates power values. In one embodiment, power measurement system 200 calculates power values according to Equation 1 for power transmission from a cyclist to a bicycle.

At step 1620, power measurement system 200 transmits one or more power values calculated in step 1618. In one embodiment a user interface device 1501 is configured to receive and display the one or more power values.

In certain embodiments, power measurement system 200 transmits measured power values and/or other data to a user interface device, such as user interface device 1501. In certain embodiments, power measurement system 200 transmits measured sensor data to user interface device 1501, instead calculates power using the measured sensor data.

For clarity, the description herein refers to drive side and non-drive side components and measuring forces at the drive side. However, the disclosed techniques for measuring at the drive side also apply to the non-drive side of power measurement system 200. More generally, components referred to herein with respect to the drive side can be considered to be disposed at a measurement side of power measurement system 200. In one embodiment, the measurement side is the drive side and a measurement side inner bearing cup is drive side inner bearing cup 202, a measurement side outer bearing cup is drive side outer bearing cup 204, and a measurement side bottom bracket bearing is drive side bottom bracket bearing 201. In an alternative embodiment, the measurement side is the non-drive side and a measurement side inner bearing cup is a non-drive side inner bearing cup, a measurement side outer bearing cup is a non-drive side outer bearing cup, and a measurement side bottom bracket bearing is non-drive side bottom bracket bearing 211. In this alternative embodiment, components associated with performing physical measurements can be positioned at the non-drive side.

An open volume between measurement side outer bearing cup and measurement side inner bearing cup can contain air or any other compressible or deformable solid material. In general, calibration of power measurement system 200 can account for force transfer through the solid material. Furthermore, the measurement side outer bearing cup and measurement side inner bearing cup can be fabricated in a form that includes any technically suitable open volume geometry (e.g., circular, square, octagonal, etc.), while preserving a circular geometry for mounting the measurement side bottom bracket bearing.

In summary, techniques are disclosed for measuring power transmitted from a cyclist to a bicycle through crank arms. The techniques indirectly measure power values for power transmitted through the crank arms using directly measured physical values for vertical bearing reaction force, rotational position, and rotational velocity. The directly measured physical values are sampled from sensors that do not rotate or move with respect to a bicycle frame. The sensors are easily packaged within a bicycle bottom bracket shell.

The disclosed systems and methods have been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described systems and methods can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system, comprising:
   a measurement side inner bearing cup having an outside diameter, configured to fit within a measurement side outer bearing cup having an inside diameter, wherein an open volume is formed between the outside diameter of the measurement side inner bearing cup and the inside diameter of the measurement side outer bearing cup;
   a first load sensor, coupled to the measurement side inner bearing cup at a first position along the outside diameter and within the open volume, wherein the first load sensor is configured to provide a first analog electrical signal responsive to a first applied force;
   a presence sensor configured to generate a detection signal in response to detecting proximity to a detection feature;
   an analog-to-digital converter configured to sample the first analog electrical signal into corresponding digital values; and
   a processor coupled to the analog-to-digital converter and the presence sensor, and configured to:
      generate a force value corresponding to one of the digital values;
      generate a rotational position value using the detection signal;
      generate a rotational velocity value using the detection signal;
      calculate a torque value by dividing a first product of multiplying the force value with a length value for a crank arm by a sine function of the rotational position value; and
      calculate a power value by multiplying the torque value with the rotational velocity value.

2. The system of claim 1, wherein the processor is further configured to transmit the power value through a wireless communications module.

3. The system of claim 1, further comprising a bicycle bottom bracket shell configured to encompass the measurement side inner bearing cup, the first load sensor, the presence sensor, the analog-to-digital converter, and the processor.

4. The system of claim 1, further comprising a second load sensor coupled to the measurement side inner bearing cup at a second position along the outside diameter and within the open volume, wherein the second load sensor is configured to provide a second analog electrical signal responsive to a second applied force, and wherein the analog-to-digital converter is further configured to sample the second analog electrical signal into corresponding second digital values, and wherein the processor is further configured to generate a second corresponding force value for computing torque.

5. The system of claim 1, further comprising:
   a crank spindle coupled to the measurement side inner bearing cup through a measurement side bottom bracket bearing;
   a crank position sensor sleeve, coupled to the crank spindle, wherein the crank position sensor sleeve includes a perimeter; and
   a set of detection features disposed around the perimeter along a path that intersects with the presence sensor.

6. The system of claim 5, further comprising
   a first crank arm, coupled to a first end of the crank spindle, wherein an effective length value for the first crank arm is the length value for a crank arm;
   a second crank arm coupled to a second opposing end of the crank spindle;
   a drive sprocket coupled to the crank spindle; and
   a bicycle bottom bracket shell configured to encompass the measurement side inner bearing cup, the first load sensor, the presence sensor, the analog-to-digital converter, the processor, a battery, and a wireless communication module.

7. The system of claim 5, wherein the force value is a vertical bearing reaction force at the measurement side bottom bracket bearing.

8. The system of claim 1, wherein to generate the force value, the processor is configured to map the one of the digital values through a first sensor calibration curve by using the one of the digital values as either an input to a first calibration curve equation or to perform a first lookup operation within a first lookup table of sensor calibration curve data.

9. The system of claim 1, wherein to generate the force value corresponding to one of the digital values, the processor is configured to:
   map the one of the digital values through a first sensor calibration curve defined for a first temperature to obtain a first temperature force value;
   map the one of the digital values through a second calibration curve defined for a second temperature to obtain a second temperature force value; and
   interpolate between the first temperature force value and the second temperature force value using a given temperature value.

10. The system of claim 1, wherein the detection feature comprises a permanent magnet, and the presence sensor comprises a Hall Effect sensor or an inductive sensor.

11. The system of claim 10, further comprising a bicycle bottom bracket shell configured to encompass the measurement side inner bearing cup, the first load sensor, the presence sensor, the detection feature, the analog-to-digital converter, and the processor.

12. The system of claim 10, further comprising a cartridge or module configured to be installed into a bicycle bottom bracket shell, the cartridge or module configured to encompass the measurement side inner bearing cup, the first load sensor, the presence sensor, the detection feature, the analog-to-digital converter, and the processor.

13. The system of claim 1, wherein the detection feature comprises an optical mark, and the presence sensor comprises an optical sensor.

14. The system of claim 1, wherein the detection feature comprises a ball within a measurement side bottom bracket bearing.

15. The system of claim 1, wherein the first load sensor is fabricated to conform in shape to at least an arc section of the open volume.

16. A system, comprising a measurement side inner bearing cup having an outside diameter, configured to fit within a measurement side outer bearing cup having an inside diameter;
   a first strain block, coupled to the measurement side inner bearing cup at a first position along the outside diameter and the inside diameter of the measurement side outer bearing cup;
   a first strain gauge, coupled to the first strain block, wherein the first strain gauge is configured to provide a first analog electrical signal responsive to a first applied force;
   a presence sensor configured to generate a detection signal in response to detecting proximity to a detection feature;
   an analog-to-digital converter configured to sample the first analog electrical signal into corresponding digital values; and
   a processor coupled to the analog-to-digital converter and the presence sensor, and configured to:
      generate a force value corresponding to one of the digital values;
      generate a rotational position value using the detection signal;
      generate a rotational velocity value using the detection signal;
      calculate a torque value by dividing a first product of multiplying the force value with a length value for a crank arm by a sine function of the rotational position value; and
      calculate a power value by multiplying the torque value with the rotational velocity value.

17. The system of claim 16, wherein the processor is further configured to transmit the power value through a wireless communications module.

18. The system of claim 16, further comprising:
   a crank spindle coupled to the measurement side inner bearing cup through a measurement side bottom bracket bearing;
   a crank position sensor sleeve, coupled to the crank spindle, wherein the crank position sensor sleeve includes a perimeter; and
   a set of detection features disposed around the perimeter along a path that intersects with the presence sensor.

19. The system of claim 18, further comprising
   a first crank arm, coupled to a first end of the crank spindle, wherein an effective length value for the first crank arm is the length value for a crank arm;
   a second crank arm coupled to a second opposing end of the crank spindle;
   a drive sprocket coupled to the crank spindle; and
   a bicycle bottom bracket shell configured to encompass the measurement side inner bearing cup, the first strain block, the first strain gauge, the presence sensor, the analog-to-digital converter, the processor, a battery, and a wireless communication module.

20. A system, comprising:
   a measurement side inner bearing cup having an outside diameter, configured to fit within a measurement side outer bearing cup having an inside diameter, wherein an open volume is formed between the outside diameter of the measurement side inner bearing cup and the inside diameter of the measurement side outer bearing cup;

a first load sensor, coupled to the measurement side inner bearing cup at a first position along the outside diameter and within the open volume, wherein the first load sensor is configured to provide a first analog electrical signal responsive to an applied force;

an analog-to-digital converter configured to sample the first analog electrical signal into corresponding digital values; and a processor coupled to the analog-to-digital converter and configured to:
 generate a force value corresponding to one of the digital values;
 generate a rotational position value using a first set of the digital values;
 generate a rotational velocity value using a second set of the digital values;
 calculate a torque value by dividing a first product of multiplying the force value with a length value for a crank arm by a sine function of the rotational position value; and
 calculate a power value by multiplying the torque value with the rotational velocity value.

21. The system of claim 20, wherein the processor configured to generate the rotational position value using the first set of the digital values does so by detecting rotational position of the first load sensor.

22. The system of claim 20, wherein the processor configured to generate the rotational velocity value using the second set of the digital values does so based on a time interval between samples of the first analog electrical signal corresponding to the second set of the digital values.

* * * * *